(12) United States Patent
Stonecypher et al.

(10) Patent No.: US 7,113,550 B2
(45) Date of Patent: *Sep. 26, 2006

(54) TECHNIQUE FOR IMPROVING THE QUALITY OF DIGITAL SIGNALS IN A MULTI-LEVEL SIGNALING SYSTEM

(75) Inventors: William Stonecypher, San Jose, CA (US); Anthony Bessios, Fremont, CA (US); Amita Agarwal, Baltimore, MD (US)

(73) Assignee: Rambus Inc., Los Altos, CA (US)

( * ) Notice: Subject to any disclaimer, the term of this patent is extended or adjusted under 35 U.S.C. 154(b) by 429 days.

This patent is subject to a terminal disclaimer.

(21) Appl. No.: 10/314,985

(22) Filed: Dec. 10, 2002

(65) Prior Publication Data

US 2004/0109509 A1 Jun. 10, 2004

(51) Int. Cl.
*H04L 25/34* (2006.01)

(52) U.S. Cl. .......................... 375/288; 375/353; 341/56
(58) Field of Classification Search ................. 375/259, 375/264, 286, 288, 292, 353; 341/56–59, 341/96, 97, 98, 106
See application file for complete search history.

(56) References Cited

U.S. PATENT DOCUMENTS

| | | | |
|---|---|---|---|
| 3,754,237 A | 8/1973 | de Laage de Meux | |
| 4,408,189 A | 10/1983 | Betts et al. | |
| 4,486,739 A | 12/1984 | Franaszek et al. | |
| 4,495,626 A | 1/1985 | Brunin et al. | |
| 4,665,517 A | 5/1987 | Widmer | |
| 4,667,337 A | 5/1987 | Fletcher | |
| 4,855,742 A | 8/1989 | Verboom | |
| 5,142,167 A | 8/1992 | Temple et al. | |
| 5,655,078 A | 8/1997 | Anderson et al. | |
| 5,903,231 A | 5/1999 | Emelko | |
| 5,999,571 A | 12/1999 | Shin et al. | |
| 6,005,895 A | 12/1999 | Perino et al. | |
| 6,018,304 A | 1/2000 | Bessios | |
| 6,031,472 A * | 2/2000 | Johnson et al. ............... 341/58 |
| 6,067,326 A | 5/2000 | Jonsson et al. | |
| 6,078,627 A | 6/2000 | Crayford | |
| 6,094,461 A | 7/2000 | Heron | |
| 6,226,330 B1 | 5/2001 | Mansur | |
| 6,324,602 B1 | 11/2001 | Chen et al. | |
| 6,538,584 B1 * | 3/2003 | Borkar et al. .................. 341/58 |
| 6,731,692 B1 * | 5/2004 | Bhoja ........................... 375/286 |
| 2003/0152154 A1 * | 8/2003 | Johnson ....................... 375/259 |

OTHER PUBLICATIONS

Mrcea R. Stan et al., "Coding a terminated bus for low power," Great Lakes Sympon VLSI., Mar., 1995, pp. 70–73.
Mrcea R. Stan, "Bus–Invert coding for low power I/O," IEEE Transactions On Very Large Scale Integration (VLSI) Systems, vol. XX, No. Y, 1999, pp. 100–108.

(Continued)

*Primary Examiner*—Don N. Vo
(74) *Attorney, Agent, or Firm*—Hunton & Williams LLP

(57) ABSTRACT

A technique for improving the quality of digital signals in a multi-level signaling system is disclosed. In one particular exemplary embodiment, the technique may be realized as a method for improving the quality of transmitted digital signals in a multi-level signaling system wherein digital signals representing more than one bit of information may be transmitted at more than two signal levels on a single transmission medium. The method comprises encoding digital values represented by sets of N bits to provide corresponding sets of P symbols, wherein each set of P symbols is selected to eliminate full-swing transitions between successive digital signal transmissions. The method also comprises transmitting the sets of P symbols.

53 Claims, 28 Drawing Sheets

OTHER PUBLICATIONS

Kazuyuki Nakamura et al., A 500–MHz 4–Mb CMOS pipeline–burst cache SRAM with point–to–point noise reduction coding I/O.

David D. Falconer et al., "Bounds on error–pattern probabilities for digital communications systems," IEEE Transactions Communications, vol. COM–20, No. 2, Apr., 1972, pp. 132–139.

Ramin Farjad–Rad et al., "A 0.3–µm CMOS 8–Gb/s 4–PAM serial link transceiver," IEEE Journal of Solid–State Circuits, vol. 35, No. 5, May, 2000.

A. X. Widmer et al., "A dc–balanced, partitioned–block, 8B/10B transmission code," pp. 440–451.

* cited by examiner

| abc | note | ABCD | note |
|-----|------|------|------|
| 000 |  | 0301 | needs fix, special case |
| 001 | CDR | 0013 | CDR |
| 002 | illegal | 0321 | CDR |
| 003 |  | 0331 | needs fix, special case |
| 010 | CDR | 0103 | CDR |
| 011 | CDR | 0113 | CDR |
| 012 | CDR | 0123 | CDR |
| 013 | CDR | 0133 | CDR |
| 020 | illegal | 0101 | CDR |
| 021 | illegal | 0111 | CDR |
| 022 | illegal | 0121 | CDR |
| 023 | illegal | 0131 | CDR |
| 030 |  | 0001 | needs fix, special case |
| 031 | CDR | 0313 | CDR |
| 032 | CDR | 0323 | CDR |
| 033 | needs fix, special case | 0031 | needs fix, special case |
| 100 | CDR | 1003 | CDR |
| 101 | CDR | 1013 | CDR |
| 102 | illegal | 1321 | CDR |
| 103 | CDR | 1033 | CDR |
| 110 | CDR | 1103 | CDR |
| 111 |  | 1113 | CDR |
| 112 |  | 1123 | CDR |
| 113 | CDR | 1133 | CDR |
| 120 | illegal | 1101 | CDR |
| 121 |  | 1213 | CDR |
| 122 |  | 1223 | CDR |
| 123 | CDR | 1233 | CDR |
| 130 | CDR | 1303 | CDR |
| 131 | CDR | 1313 | CDR |
| 132 | CDR | 1323 | CDR |
| 133 | CDR | 1333 | CDR |
| 200 | illegal | 2301 | CDR |
| 201 | illegal | 2311 | CDR |
| 202 | illegal | 2321 | CDR |
| 203 | illegal | 2331 | CDR |
| 210 | CDR | 2103 | CDR |
| 211 |  | 2113 | CDR |
| 212 |  | 2123 | CDR |
| 213 | CDR | 2133 | CDR |
| 220 | illegal | 2101 | CDR |
| 221 |  | 2213 | CDR |
| 222 |  | 2223 | CDR |
| 223 | CDR | 2233 | CDR |
| 230 | CDR | 2303 | CDR |
| 231 | CDR | 2313 | CDR |
| 232 | CDR | 2323 | CDR |
| 233 | CDR | 2333 | CDR |
| 300 |  | 3301 | needs fix, special case |
| 301 | CDR | 3013 | CDR |
| 302 | illegal | 3321 | CDR |
| 303 |  | 3331 | needs fix, special case |
| 310 | CDR | 3103 | CDR |
| 311 | CDR | 3113 | CDR |
| 312 | CDR | 3123 | CDR |
| 313 | CDR | 3133 | CDR |
| 320 | illegal | 3101 | CDR |
| 321 | CDR | 3213 | CDR |
| 322 | CDR | 3223 | CDR |
| 323 | CDR | 3233 | CDR |
| 330 |  | 3001 | needs fix, special case |
| 331 | CDR | 3313 | CDR |
| 332 | CDR | 3323 | CDR |
| 333 |  | 3031 | needs fix, special case |

Figure 5

| invCode | Number of abcdefgh combinations requiring this invCode value to fix |
|---------|---------------------------------------------------------------------|
| 0000    | 28642                                                               |
| 0001    | 7486                                                                |
| 0010    | 6958                                                                |
| 0100    | 6862                                                                |
| 1000    | 3526                                                                |
| 0011    | 2482                                                                |
| 0110    | 2338                                                                |
| 0101    | 1810                                                                |
| 1100    | 1546                                                                |
| 1001    | 922                                                                 |
| 1010    | 874                                                                 |
| 0111    | 766                                                                 |
| 1110    | 454                                                                 |
| 1101    | 406                                                                 |
| 1011    | 310                                                                 |
| 1111    | 154                                                                 |

Figure 9A

| LJ value | invCode mapping or indirection |
|---|---|
| 00 | Use M1 when (H < 2) |
| 01 | Use M2 when (H < 2) |
| 02 | Illegal, not available |
| 03 | 1100 (H < 2) |
| 10 | 0001 |
| 11 | 0010 |
| 12 | 0100 |
| 13 | 0000 |
| 20 | Illegal, not available |
| 21 | Use M2 (H >= 2) |
| 22 | Use M1 (H >= 2) |
| 23 | 1100 (H >= 2) |
| 30 | 1000 |
| 31 | 0011 |
| 32 | 0110 |
| 33 | 0101 |

Figure 9B

| fgh | invCode | FGH, IJ |
|---|---|---|
| 0 2 0 | 0111 | 303, 00 |
| 0 2 1 | 0111 | 313, 00 |
| 0 2 2 | 0111 | 323, 00 |
| 0 2 3 | 0111 | 333, 00 |
| 2 0 0 | 0111 | 300, 00 |
| 2 0 1 | 0111 | 310, 00 |
| 2 0 3 | 0111 | 330, 00 |
| 0 0 2 | 0111 | 012, 22 |
| 1 0 2 | 0111 | 112, 22 |
| 2 0 2 | 0111 | 212, 22 |
| 3 0 2 | 0111 | 312, 22 |
| 1 2 0 | 0111 | 122, 22 |
| 2 2 0 | 0111 | 222, 22 |
| 3 2 0 | 0111 | 322, 22 |
| 0 2 0 | 1001 | 101, 22 |
| 0 2 1 | 1001 | 111, 22 |
| 0 2 2 | 1001 | 121, 22 |
| 0 2 3 | 1001 | 131, 22 |
| 2 0 0 | 1001 | 100, 00 |
| 2 0 1 | 1001 | 110, 00 |
| 2 0 3 | 1001 | 130, 00 |
| 0 0 2 | 1001 | 103, 22 |
| 1 0 2 | 1001 | 113, 22 |
| 2 0 2 | 1001 | 123, 22 |
| 3 0 2 | 1001 | 133, 22 |
| 1 2 0 | 1001 | 111, 00 |
| 2 2 0 | 1001 | 121, 00 |
| 3 2 0 | 1001 | 131, 00 |
| 0 2 0 | 1011 | 032, 22 |
| 0 2 1 | 1011 | 132, 22 |
| 0 2 2 | 1011 | 232, 22 |
| 0 2 3 | 1011 | 332, 22 |
| 2 0 0 | 1011 | 001, 00 |
| 2 0 1 | 1011 | 101, 00 |
| 2 0 3 | 1011 | 301, 00 |
| 0 0 2 | 1011 | 000, 00 |
| 1 0 2 | 1011 | 010, 00 |
| 2 0 2 | 1011 | 123, 00 |
| 3 0 2 | 1011 | 030, 00 |
| 1 2 0 | 1011 | 211, 00 |
| 2 2 0 | 1011 | 221, 00 |
| 3 2 0 | 1011 | 231, 00 |

FIGURE 10A

| f g h | invCode | FGH, IJ |
|---|---|---|
| 0 2 0 | 1101 | 301, 22 |
| 0 2 1 | 1101 | 311, 22 |
| 0 2 2 | 1101 | 321, 22 |
| 0 2 3 | 1101 | 331, 22 |
| 2 0 0 | 1101 | 103, 00 |
| 2 0 1 | 1101 | 113, 00 |
| 2 0 3 | 1101 | 133, 00 |
| 0 0 2 | 1101 | 303, 22 |
| 1 0 2 | 1101 | 313, 22 |
| 2 0 2 | 1101 | 323, 22 |
| 3 0 2 | 1101 | 333, 22 |
| 1 2 0 | 1101 | 311, 00 |
| 2 2 0 | 1101 | 321, 00 |
| 3 2 0 | 1101 | 331, 00 |
| 0 2 0 | 1111 | 001, 22 |
| 0 2 1 | 1111 | 011, 22 |
| 0 2 2 | 1111 | 221, 22 |
| 0 2 3 | 1111 | 031, 22 |
| 2 0 0 | 1111 | 003, 22 |
| 2 0 1 | 1111 | 013, 22 |
| 2 0 3 | 1111 | 033, 22 |
| 0 0 2 | 1111 | 003, 00 |
| 1 0 2 | 1111 | 213, 22 |
| 2 0 2 | 1111 | 223, 22 |
| 3 0 2 | 1111 | 233, 22 |
| 1 2 0 | 1111 | 213, 00 |
| 2 2 0 | 1111 | 223, 00 |
| 3 2 0 | 1111 | 233, 00 |

FIGURE 10B

| d e f | invCode | h | DEF, IJ |
|---|---|---|---|
| 0 2 0 | 1010 | 0 or 1 | 101, 01 |
| 0 2 1 | 1010 | 0 or 1 | 111, 01 |
| 0 2 2 | 1010 | 0 or 1 | 123, 01 |
| 0 2 3 | 1010 | 0 or 1 | 133, 01 |
| 2 0 0 | 1010 | 0 or 1 | 103, 01 |
| 2 0 1 | 1010 | 0 or 1 | 113, 01 |
| 2 0 3 | 1010 | 0 or 1 | 131, 01 |
| 0 0 2 | 1010 | 0 or 1 | 301, 01 |
| 1 0 2 | 1010 | 0 or 1 | 311, 01 |
| 2 0 2 | 1010 | 0 or 1 | 323, 01 |
| 3 0 2 | 1010 | 0 or 1 | 333, 01 |
| 1 2 0 | 1010 | 0 or 1 | 303, 01 |
| 2 2 0 | 1010 | 0 or 1 | 321, 01 |
| 3 2 0 | 1010 | 0 or 1 | 331, 01 |
| 0 2 0 | 1010 | 2 or 3 | 101, 21 |
| 0 2 1 | 1010 | 2 or 3 | 111, 21 |
| 0 2 2 | 1010 | 2 or 3 | 123, 21 |
| 0 2 3 | 1010 | 2 or 3 | 133, 21 |
| 2 0 0 | 1010 | 2 or 3 | 103, 21 |
| 2 0 1 | 1010 | 2 or 3 | 113, 21 |
| 2 0 3 | 1010 | 2 or 3 | 131, 21 |
| 0 0 2 | 1010 | 2 or 3 | 301, 21 |
| 1 0 2 | 1010 | 2 or 3 | 311, 21 |
| 2 0 2 | 1010 | 2 or 3 | 323, 21 |
| 3 0 2 | 1010 | 2 or 3 | 333, 21 |
| 1 2 0 | 1010 | 2 or 3 | 303, 21 |
| 2 2 0 | 1010 | 2 or 3 | 321, 21 |
| 3 2 0 | 1010 | 2 or 3 | 331, 21 |

FIGURE 11A

| d e f | invCode | h | DEF, IJ |
|---|---|---|---|
| 0 2 0 | 1110 | 0 or 1 | 001, 01 |
| 0 2 1 | 1110 | 0 or 1 | 011, 01 |
| 0 2 2 | 1110 | 0 or 1 | 003, 01 |
| 0 2 3 | 1110 | 0 or 1 | 013, 01 |
| 2 0 0 | 1110 | 0 or 1 | 031, 01 |
| 2 0 1 | 1110 | 0 or 1 | 033, 01 |
| 2 0 3 | 1110 | 0 or 1 | 313, 01 |
| 0 0 2 | 1110 | 0 or 1 | 221, 01 |
| 1 0 2 | 1110 | 0 or 1 | 231, 01 |
| 2 0 2 | 1110 | 0 or 1 | 223, 01 |
| 3 0 2 | 1110 | 0 or 1 | 233, 01 |
| 1 2 0 | 1110 | 0 or 1 | 211, 01 |
| 2 2 0 | 1110 | 0 or 1 | 213, 01 |
| 3 2 0 | 1110 | 0 or 1 | 121, 01 |
| 0 2 0 | 1110 | 2 or 3 | 001, 21 |
| 0 2 1 | 1110 | 2 or 3 | 011, 21 |
| 0 2 2 | 1110 | 2 or 3 | 003, 21 |
| 0 2 3 | 1110 | 2 or 3 | 013, 21 |
| 2 0 0 | 1110 | 2 or 3 | 031, 21 |
| 2 0 1 | 1110 | 2 or 3 | 033, 21 |
| 2 0 3 | 1110 | 2 or 3 | 313, 21 |
| 0 0 2 | 1110 | 2 or 3 | 221, 21 |
| 1 0 2 | 1110 | 2 or 3 | 231, 21 |
| 2 0 2 | 1110 | 2 or 3 | 223, 21 |
| 3 0 2 | 1110 | 2 or 3 | 233, 21 |
| 1 2 0 | 1110 | 2 or 3 | 211, 21 |
| 2 2 0 | 1110 | 2 or 3 | 213, 21 |
| 3 2 0 | 1110 | 2 or 3 | 121, 21 |

FIGURE 11B

| IJ value | selM1, selM2, IJ_invCode | Comments |
|---|---|---|
| 00 | 0, 1, 0000 | Use M1 Table, assert selM1 |
| 01 | 1, 0, 0000 | Use M2 Table, assert selM2 |
| 02 | 0, 0, 0000 | Illegal, define to reduce |
| 03 | 0, 0, 1100 | |
| 10 | 0, 0, 0001 | |
| 11 | 0, 0, 0010 | |
| 12 | 0, 0, 0100 | |
| 13 | 0, 0, 0000 | |
| 20 | 0, 0, 0000 | Illegal, define to reduce |
| 21 | 1, 0, 0000 | Use M2 Table, assert selM2 |
| 22 | 0, 1, 0000 | Use M1 Table, assert selM1 |
| 23 | 0, 0, 1100 | |
| 30 | 0, 0, 1000 | |
| 31 | 0, 0, 0011 | |
| 32 | 0, 0, 0110 | |
| 33 | 0, 0, 0101 | |

FIGURE 13

| Uncoded | Encoded |
|---------|---------|
| 01010101 | 0101011101 |
| 01010110 | 0101100111 |
| 01011001 | 0101101101 |
| 01011010 | 0101110101 |
| 01100101 | 0101111111 |
| 01100110 | 0110010111 |
| 01101001 | 0110011101 |
| 01101010 | 0110110101 |
| 01001011 | 0111000111 |
| 01100011 | 0111001101 |
| 01001001 | 0111001110 |
| 01100001 | 0111010101 |
| 10000000 | 0111011111 |
| 10001100 | 0111101100 |
| 10110000 | 0111110111 |
| 10111100 | 0111111101 |
| 00001000 | 1100010111 |
| 00001010 | 1100011101 |
| 00010010 | 1100110101 |
| 00100000 | 1101001110 |
| 00100010 | 1101010101 |
| 00111000 | 1101010110 |
| 10000010 | 1101011111 |
| 10011000 | 1101100101 |
| 10101000 | 1101101100 |
| 10110010 | 1101110111 |
| 00010101 | 1101111101 |
| 00011001 | 1111010111 |
| 00100101 | 1111011101 |
| 00101001 | 1111110101 |

FIGURE 16

| Uncoded | Encoded |
| --- | --- |
| 00100111 | 0111010101 |
| 10100111 | 0111010100 |
| 01000111 | 0111010011 |
| 11000111 | 0111010001 |
| 00101101 | 0111011001 |
| 01001101 | 0111010000 |
| 10101101 | 0111010110 |
| 11001101 | 0111011010 |
| 11000101 | 0111110001 |
| 11000110 | 0111110000 |
| 11001001 | 1101010100 |
| 11001010 | 1101010110 |
| 00101100 | 1101010101 |
| 00101111 | 1101010011 |
| 00100000 | 1101110001 |
| 00100011 | 1101110000 |

FIGURE 18

TECHNIQUE FOR IMPROVING THE QUALITY OF DIGITAL SIGNALS IN A MULTI-LEVEL SIGNALING SYSTEM

FIELD OF THE INVENTION

The present invention relates generally to multi-level signaling and, more particularly, to a technique for improving the quality of digital signals in a multi-level signaling system.

BACKGROUND OF THE INVENTION

High-speed serial link channels delivering an effective data rate above 5 Gb/s in a backplane environment are subject to significant signal distortion due to inter-symbol interference (ISI). Transmitters and receivers need to compensate most of the signal distortion using very low complexity schemes in order to obtain a target bit error rate (BER) of less than or equal to $10^{-17}$ at Gb/s rates and under severe power and complexity restrictions. This constrained space presents significant challenges to well-known signal processing and coding techniques, and sub-optimal but efficient alternatives are sometimes needed to fulfill the task.

Attenuation caused by conductor and dielectric losses causes dispersion ISI. Another important ISI component is reflections, which are essentially multipath components of a signal and originate from impedance discontinuities such as those caused by connectors of line cards at both transmit and receive ends. In addition to ISI distortion, cross-talk effects from far and near end adjacent channels is becoming increasingly significant.

To counteract channel attenuation at high bit rates, 4-level pulse amplitude modulation (4-PAM) signaling is often used instead of conventional 2-level pulse amplitude modulation (2-PAM) signaling. That is, in a 2-PAM signaling system, each conductor in the system may carry signals at one of two signal levels (i.e., at either a logic zero level or a logic one level). Thus, in a 2-PAM signaling system, each conductor in the system can only transmit one bit of data at a time. However, in a 4-PAM signaling system, each conductor in the system may carry signals at four different signal levels (i.e., four different symbols). Thus, in a 4-PAM signaling system, each conductor in the system can transmit two bits of data simultaneously at half of the symbol rate for an equivalent bandwidth.

In a 4-PAM signaling system that uses current-based output drivers, the four different signal levels are represented by different current values. For example, the four different current levels may be identified as 0i, 1i, 2i, and 3i. Similarly, in a 4-PAM transmission system that uses voltage-based output drivers, the four different signal levels are represented by different voltage values. For example, the four different voltage levels may be identified as 0v, 1v, 2v, and 3v. Both of these types of output drivers are typically connected in a transmission line environment that presents an effective resistance or impedance to the output driver. This transmission line impedance causes the output voltage to change if the output current from the current driver changes, and causes the output current to change if the output voltage from the voltage driver changes.

A 4-PAM signaling system may be used in systems having either differential pairs of signals or single-ended signals referenced to ground. In a 4-PAM signaling system utilizing many single-ended output drivers, it is desirable to maintain the total signal current required to transmit a byte of data (or code word) at a relatively constant current level in comparison to other bytes of data (or code words). If the signal current fluctuates greatly from one byte to the next, current changes flow through power supply connections and cause noise. These current changes occur when using either voltage drivers or current drivers. The noise on the power supply increases in systems that have high data transmission rates and fast edge rate transmitters. This noise on the power supply degrades the voltage margins of the signals.

Understandably, while advantageous in channels with dominant attenuation, 4-PAM signaling systems are more sensitive to reflections and cross-talk than 2-PAM signaling systems due to the reduction in signal margin as a result of carrying more information per symbol. Thus, in cases where high loss and reflections are combined, the advantages of 4-PAM signaling over 2-PAM signaling may be lost.

In order to preserve the advantages of 4-PAM signaling over 2-PAM signaling it would be desirable to eliminate full-swing transitions (FST) between sequential 4-PAM symbols. This could enhance system performance in terms of: 1.) voltage margins (Vm), by reducing peak distortion (PD) via the elimination of one or more worst case sequences; and 2.) timing margins (Tm), especially at outer eyes where FST close eyes the most.

It would also be desirable to secure a minimum density of desirable symbol transitions useful for clock recovery. These clock data recovery (CDR) transitions could prevent continuous phase drifting from an optimum sampling point at the center of an eye in plesiochronous systems with frequency offsets between received data and a local receive clock.

In view of the foregoing, it would be desirable to provide a technique for improving the quality of digital signals in a multi-level signaling system which overcomes the above-described inadequacies and shortcomings in an efficient and cost effective manner.

SUMMARY OF THE INVENTION

According to the present invention, a technique for improving the quality of digital signals in a multi-level signaling system is provided. In one particular exemplary embodiment, the technique may be realized as a method for improving the quality of transmitted digital signals in a multi-level signaling system wherein digital signals representing more than one bit of information may be transmitted at more than two signal levels on a single transmission medium. The method comprises encoding digital values represented by sets of N bits to provide corresponding sets of P symbols, wherein each set of P symbols is selected to eliminate full-swing transitions between successive digital signal transmissions. The method also comprises transmitting the sets of P symbols.

In accordance with other aspects of this particular exemplary embodiment of the present invention, each set of P symbols may beneficially be formed with Q bits, wherein Q is greater than N. For example, N may equal 8 and Q may equal 10. Alternatively, N may equal 6 and Q may equal 8. Alternatively still, N may equal 16 and Q may equal 20.

In accordance with further aspects of this particular exemplary embodiment of the present invention digital signals may beneficially be transmitted at four signal levels on a single transmission medium. Accordingly, each symbol may then represent two bits. Also, the single transmission medium comprise a number of different configurations such as, for example, a single electrical conductor, a differential pair of electrical conductors, or an optical fiber.

In accordance with still further aspects of this particular exemplary embodiment of the present invention, each set of P symbols may beneficially include at least one transition that is substantially geometrically centered, which is particularly beneficial for clock recovery. Depending upon signal level assignments, only a most significant symbol bit or a least significant symbol bit may beneficially change during such transitions between successive symbol transmissions occurring between adjacent signal levels.

In accordance with additional aspects of this particular exemplary embodiment of the present invention, the method may further beneficially comprise receiving the transmitted sets of P symbols, and then decoding the digital values of N bits from the transmitted sets of P symbols.

In accordance with still additional aspects of this particular exemplary embodiment of the present invention, a first symbol of each set of P symbols may beneficially be selected to ensure that undesirable transitions do not occur between neighboring sets of P symbols. Also, a last symbol of each set of P symbols may beneficially be selected to ensure that undesirable transitions do not occur between neighboring sets of P symbols.

In accordance with still other aspects of this particular exemplary embodiment of the present invention, the corresponding sets of P symbols may beneficially include a first symbol and a second symbol and the digital values may beneficially be encoded by detecting an undesirable transition between the first and second symbols, and then modifying at least one of the first and second symbols to eliminate the undesirable transition. If such is the case, the undesirable transition may corresponds to a full-swing transition between the first and second symbol, wherein the first and second symbols are adjacent symbols within the corresponding sets of P symbols. Also, modifying at least one of the first and second symbols may beneficially comprise inverting an odd number of bits in a first set of P symbols that includes the first and second symbols. Alternatively, when selectively inverting at least one of the first and second symbols does not eliminate the undesirable transition, modifying at least one of the first and second symbols may beneficially comprise encoding at least one of the first and second symbols using a predetermined exception encoding scheme, and then including in the corresponding sets of P symbols an indication that the at least one of the first and second symbols has been encoded using the exception encoding scheme. Alternatively still, when selectively inverting at least one of the first and second symbols eliminates the undesirable transition, modifying at least one of the first and second symbols may beneficially comprise inverting at least one of the first and second symbols, and then including in the corresponding sets of P symbols an indication that the at least one of the first and second symbols has been inverted. If such is the case, a determination as to whether selectively inverting at least one of the first and second symbols eliminates the undesirable transition may beneficially be performed using a lookup table. Also, inverting a symbol may further beneficially comprise performing a bit-wise inversion of all bits within the symbol.

In accordance with yet other aspects of this particular exemplary embodiment of the present invention, the corresponding sets of P symbols may beneficially include a first set of P symbols and the digital values may beneficially be encoded by detecting a lack of a clock recovery transition within the first set of P symbols, and then modifying at least one symbol within the first set of P symbols to induce a clock recovery transition within the first set of P symbols. If such is the case, modifying may further beneficially comprise performing a bit-wise inversion of the at least one symbol of the first set of P symbols. Alternatively, modifying may further beneficially comprise performing a bit-wise inversion of only one symbol of the first set of P symbols.

In accordance with even further aspects of this particular exemplary embodiment of the present invention, the digital values may beneficially be encoded such that a selected symbol in each set of P symbols is limited to a subset of possible symbol choices. If such is the case, the selected symbol may beneficially be a first symbol or a last symbol of the set of P symbols. Also, the subset of possible symbol choices beneficially does not include either a highest signal level or a lowest signal level of the more than two signal levels. Then, the method may further beneficially comprise receiving the transmitted sets of P symbols, decoding the digital values represented by the sets of N bits from the transmitted sets of P symbols, and detecting at least a portion of the selected symbols in the sets of P symbols. If such is the case, detecting at least a portion of the selected symbols may beneficially comprise using the selected symbols to produce framing information corresponding to the sets of P symbols.

In another particular exemplary embodiment, the technique may be realized as at least one signal embodied in at least one carrier wave for transmitting a computer program of instructions configured to be readable by at least one processor for instructing the at least one processor to execute a computer process for performing the above-described method.

In still another particular exemplary embodiment, the technique may be realized as at least one processor readable carrier for storing a computer program of instructions configured to be readable by at least one processor for instructing the at least one processor to execute a computer process for performing the above-described method.

In yet another particular exemplary embodiment, the technique may be realized as an apparatus for improving the quality of transmitted digital signals in a multi-level signaling system wherein digital signals representing more than one bit of information may be transmitted at more than two signal levels on a single transmission medium. The apparatus comprises an encoder for encoding digital values represented by sets of N bits to provide corresponding sets of P symbols, wherein each set of P symbols is selected to eliminate full-swing transitions between successive digital signal transmissions. The apparatus also comprises a transmitter for transmitting the sets of P symbols. The apparatus may further comprise a receiver for receiving the transmitted sets of P symbols, and a decoder for decoding the digital values of N bits from the transmitted sets of P symbols. The apparatus may still further comprise additional features similar to those recited above with respect to the above-described method.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings.

These drawings should not be construed as limiting the present invention, but are intended to be exemplary only.

FIG. 5 shows a 3S4S conversion table in accordance with an embodiment of the present invention.

FIG. 9A shows all sixteen invCode combinations for the 8S10S encoder of FIG. 8, along with the number of input words requiring repair for each invCode, in accordance with an embodiment of the present invention.

FIG. 9B shows an 'IJ' Table for the 8S10S encoder of FIG. 8 in accordance with an embodiment of the present invention.

FIGS. 10A and 10B show an M1 Table for the 8S10S encoder of FIG. 8 in accordance with an embodiment of the present invention.

FIGS. 11A and 11B show an M2 Table for the 8S10S encoder of FIG. 8 in accordance with an embodiment of the present invention.

FIG. 13 shows an 'IJ' Table for the 8S10S decoder of FIG. 12 in accordance with an embodiment of the present invention.

FIG. 16 shows a look-up table for the 4S5S encoder of FIG. 14 for supporting 4S5S edge stuffing (ES) encoding in accordance with an embodiment of the present invention.

FIG. 18 shows a look-up table for the 4S5S encoder of FIG. 14 for supporting 4S5S center stuffing (CS) encoding in accordance with an embodiment of the present invention.

DETAILED DESCRIPTION OF EXEMPLARY EMBODIMENT(S)

Figure 1A:
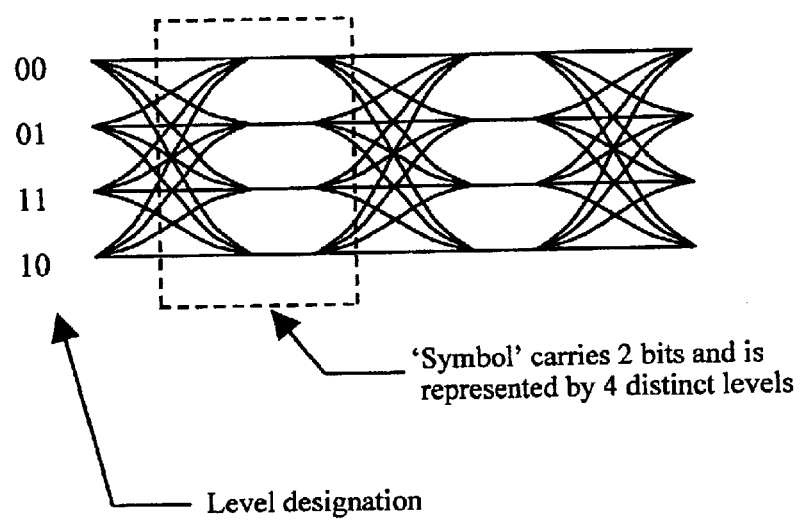
FIG. 1A shows a complete transition diagram for a 4-PAM signaling system.

Referring to FIG. 1A, there is shown a complete transition diagram for a 4-PAM signaling system. This diagram shows all of the possibilities of how a signal at a given signal level may transition to another signal level between adjacent symbols. There are 16 distinct transitions between symbols, including no transition at all.

Figure 1B:
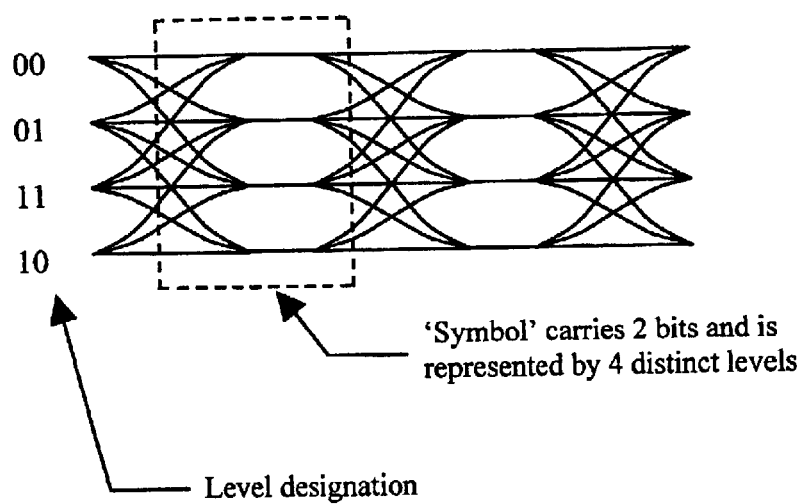
FIG. 1B shows a reduced transition diagram for a 4-PAM signaling system wherein full-swing transitions (FST) have been eliminated.

Referring to FIG. 1B, there is shown a reduced transition diagram for a 4-PAM signaling system wherein full-swing transitions (FST) have been eliminated. There are now 14 distinct transitions between symbols.

The signal level designations shown in FIGS. 1A and 1B are such that a two-bit binary value is assigned to each signal level (e.g., a Gray code assignment). Each sequential symbol carries this two-bit binary value in a 4-PAM signaling system. It should be noted, however, that the present invention is not limited to signal level designations having Gray code assignments.

Figure 2A:
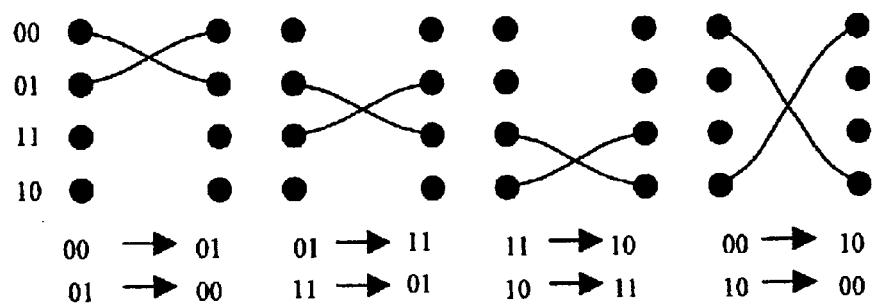
FIG. 2A shows a first group of symbol transitions which are desirable for use in clock recovery in a 4-PAM signaling system.

Referring to FIG. 2A, there is shown a first group of symbol transitions which are desirable for use in clock recovery in a 4-PAM signaling system. These symbol transitions are desirable because the crossing point of each of the waveforms is geometrically centered between symbols. Each of these symbol transitions has a property where only the most significant bit (MSB) or the least significant bit (LSB) changes from one symbol to the next. This holds true for at least the numeric assignment given to each signal level used in this detailed description. The large MSB symbol transitions are eliminated via full-swing elimination (FSE) coding. Among the remaining six symbol transitions, the small MSB symbol transitions are the most desirable since there is no need to estimate an offset for samplers. Providing an adequate quantity of transitions suitable for clock recovery is a secondary objective of the coding techniques described herein.

Figure 2B:
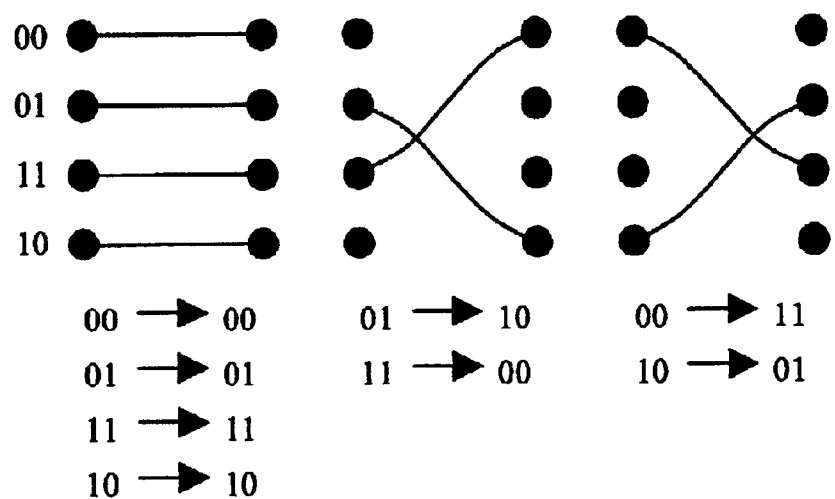
FIG. 2B shows a second group of symbol transitions which are not desirable for use in clock recovery in a 4-PAM signaling system.

Referring to FIG. 2B, there is shown a second group of symbol transitions which are not desirable for use in clock recovery in a 4-PAM signaling system. The four symbol transitions having no value change cannot be used for clock recovery at all. The remaining four symbol transitions are not desirable because the crossing point of each of the waveforms is offset to either side of the geometric center between symbols. Clock recovery using these symbol transitions would pull the optimal sampling point away from the geometric center, potentially in a data dependent manner.

Figure 3:
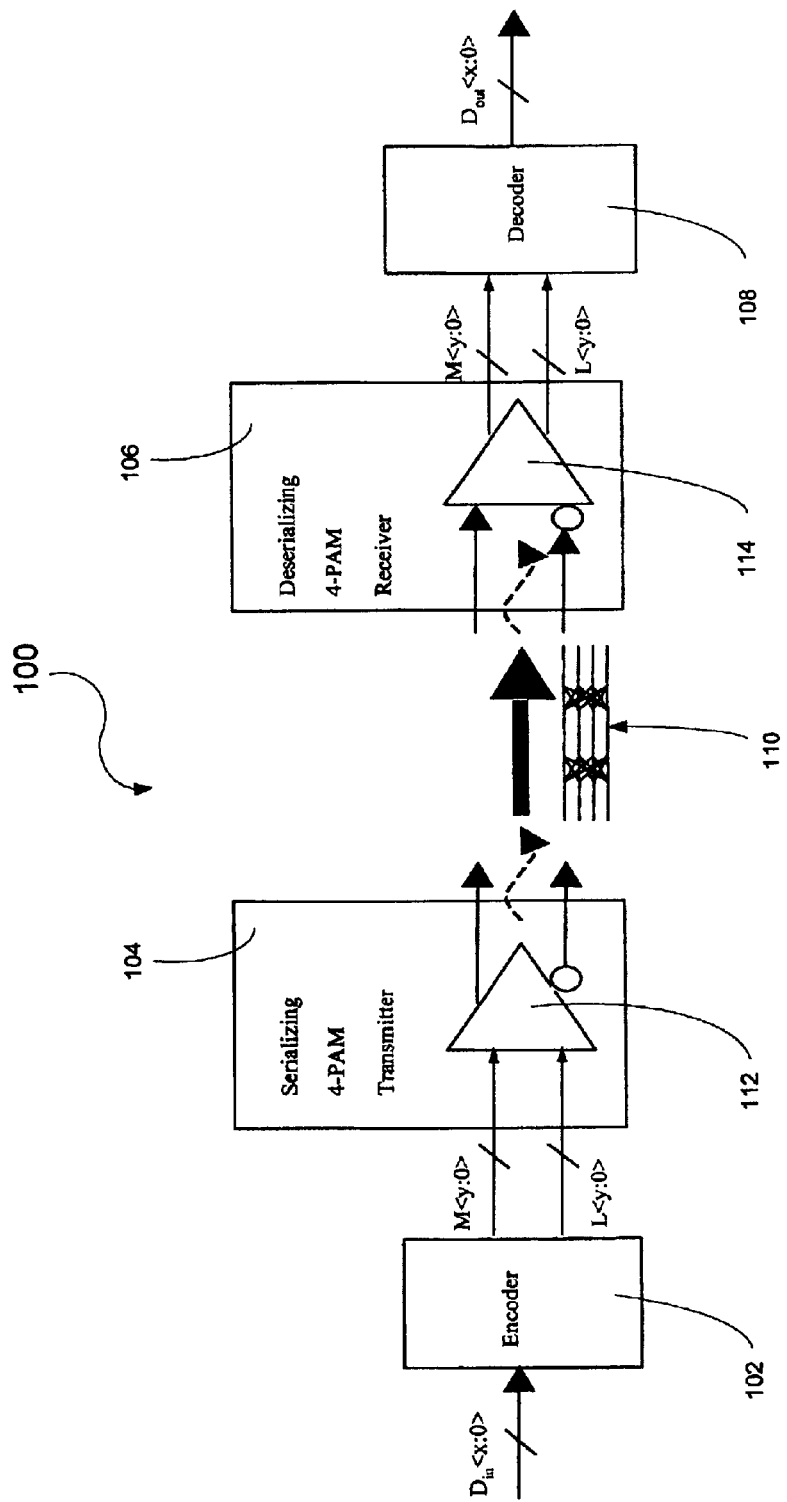
FIG. 3 shows a 4-PAM signaling system for supporting a technique for improving the quality of digital signals in a multi-level signaling system in accordance with the present invention.

Referring to FIG. 3, there is shown a 4-PAM signaling system 100 comprising an encoder 102, a serializing 4-PAM transmitter 104, a deserializing 4-PAM receiver 106, and a decoder 108. The serializing 4-PAM transmitter 104 and the deserializing 4-PAM receiver 106 are interconnected by a pair of signal carrying conductors 110.

The encoder 102 receives parallel input data $D_{IN}$, and then encodes the received parallel input data $D_{IN}$ so as to provide parallel code words to the serializing 4-PAM transmitter 104 that are organized as MSB code words (M) and LSB code words (L). The MSB code words (M) and the LSB code words (L) together include multiple consecutive symbols. The parallel input data $D_{IN}$ is received as a word having x+1 bits. The MSB code words (M) and the LSB code words (L) each have y+1 bits. The encoder 102 may be implemented with traditional binary logic.

The serializing 4-PAM transmitter 104 receives the MSB code words (M) and the LSB code words (L) in parallel form from the encoder 102. The serializing 4-PAM transmitter 104 comprises a differential transmitter 112 for differentially serially transmitting the received multiple consecutive symbols in the MSB code words (M) and the LSB code words (L) over the pair of signal carrying conductors 110 to the deserializing 4-PAM receiver 106.

The deserializing 4-PAM receiver 106 comprises a differential receiver 114 for differentially serially receiving the multiple consecutive symbols in the MSB code words (M) and the LSB code words (L) over the pair of signal carrying conductors 110 from the serializing 4-PAM transmitter 104. The differential receiver 114 then transmits the MSB code words (M) and the LSB code words (L) in parallel form to the decoder 108.

The decoder 108 is the inverse of the encoder 102. That is, the decoder 108 receives the MSB code words (M) and the LSB code words (L) in parallel form from the deserializing 4-PAM receiver 106, and then decodes the received MSB code words (M) and the received LSB code words (L) so as to provide parallel output data $D_{OUT}$. The parallel output data $D_{OUT}$ is provided as a word having x+1 bits. The decoder 108 may be implemented with traditional binary logic.

At this point it should be noted that, while FIG. 3 shows the serializing 4-PAM transmitter 104 as having the differential transmitter 112 and the deserializing 4-PAM receiver 106 as having the differential receiver 114, the present invention is not limited in this regard. That is, the MSB code words (M) and the LSB code words (L) may be transmitted from the serializing 4-PAM transmitter 104 to the deserializing 4-PAM receiver 106 in a single-ended manner requiring only a single-ended transmitter and a single-ended receiver. Thus, the serializing 4-PAM transmitter 104 and the deserializing 4-PAM receiver 106 may alternatively be interconnected by a single signal carrying conductor instead of the pair of signal carrying conductors 110. Alternatively still, in an optical based system, the serializing 4-PAM transmitter 104 and the deserializing 4-PAM receiver 106 may be interconnected by an optical fiber capable carrying signals at multiple optical signal levels.

The many embodiments described herein are directed primarily toward the encoder 102 and the decoder 108. These two components work in conjunction with the serializing 4-PAM transmitter 104 and the deserializing 4-PAM receiver 106 to provide desirable signal transmission characteristics and/or improve the signal to noise ratio for a given data rate.

One particular exemplary embodiment utilizes a 3-symbol to 4-symbol encoder and a 4-symbol to 3-symbol decoder (i.e., a 3S4S codec implementation). The 3S4S codec implementation utilizes a 3S4S transition-limiting code, which may be used as a basis for more complex codec implementations. The 3S4S transition-limiting code provides a modified 4-PAM sequence which does not have any full-swing transitions. The efficiency of the 3S4S transition-limiting code is 75%. Also, the 3S4S transition-limiting code provides desirable transitions for clock recovery, yielding at least one transition which may be used for clock recovery assuming that the clock recovery system utilizes all of the desirable small MSB symbol transitions discussed above with respect to FIG. 2A.

Figure 4:
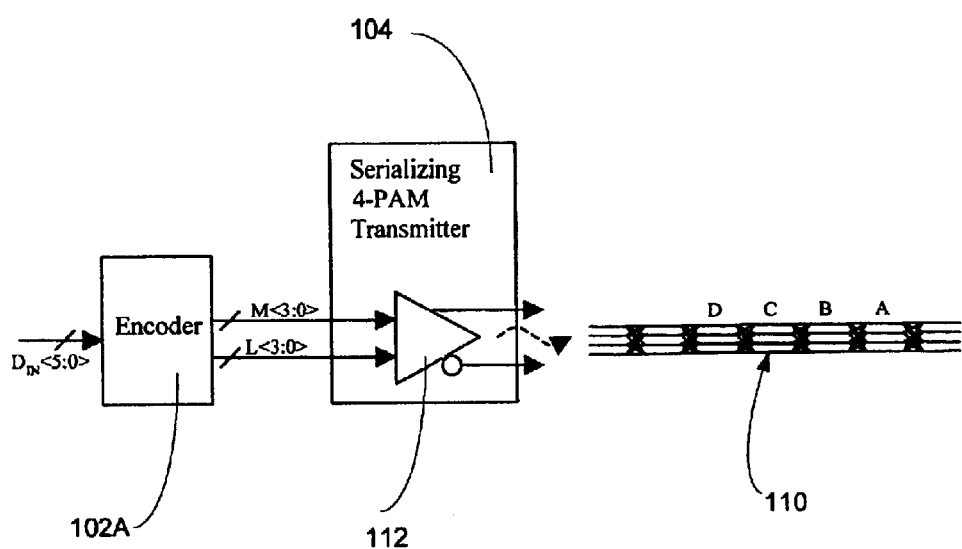
FIG. 4 shows a portion of the 4-PAM signaling system of FIG. 3 for implementing a 3S4S transition-limiting code in accordance with an embodiment of the present invention.

Referring to FIG. 4, there is shown a portion of the 4-PAM signaling system 100 of FIG. 3 comprising a 3S4S encoder 102A, the serializing 4-PAM transmitter 104, and the pair of signal carrying conductors 110. The 3S4S encoder 102A shown in FIG. 4 is for implementing a 3S4S transition-limiting code.

Similar to FIG. 3, the 3S4S encoder 102A shown in FIG. 4 receives parallel input data $D_{IN}$<5:0>, and then encodes the received parallel input data $D_{IN}$<5:0> so as to provide parallel code words to the serializing 4-PAM transmitter 104 that are organized as MSB code words (M<3:0>) and LSB code words (L<3:0>). The MSB code words (M<3:0>) and the LSB code words (L<3:0>) together include multiple consecutive symbols. The parallel input data $D_{IN}$<5:0> is received as 6-bit word. The MSB code words (M<3:0>) and the LSB code words (L<3:0>) each have 4 bits.

For purposes of showing the dataflow through the 3S4S encoder 102A, bit pairs of the input words are assigned letters and an order within the input word. For example, the $D_{IN}$<5:0> bus is assigned an 'abc' bit-pair triplet. Lower case letters are used to designate input data. The M<3:0> bus and the L<3:0> bus together represent output data. The M<3:0> bus represents the MSB's of four consecutive 4-PAM symbols, while the L<3:0> bus represents the LSB's of four consecutive 4-PAM symbols. The symbol representation of the output data is 'ABCD', where 'A' is the first symbol serially transmitted and 'D' is the last symbol serially transmitted. For implementation mapping, the concatenation of {M<0>, L<0>} represents the 'A' symbol and the concatenation of {M<3>, L<3>} represents the 'D' symbol.

The 'ABCD' symbol group is produced by first examining the 'abc' input symbol group. If an illegal symbol transition combination is present, then corrective action may be required. The corrective action requires inverting the bits of the 'b' symbol. Examples of these illegal combinations are when values 0,2 or 2,0 are present on either or both of the 'ab' or 'bc' symbol pairs. By inverting the bits (both the MSB and the LSB) of the 'b' symbol, the illegal input combination where 'ab'=0,2 is changed to 'ab'=0,1, which is legal. One may also choose a method of inverting only the LSB to correct the illegal combinations, but this is not as desirable because this does not provide for clock recovery sequences.

Some input combinations, unaltered, will not support clock recovery transitions when output. These distinct patterns need to be detected and corrected. The method for correcting these patterns is, again, to invert both the MSB and LSB of the 'b' symbol.

The 'D' output symbol is used as an opcode to indicate whether or not the 'b' bits were inverted. For this example, 'D' is always odd, represented with values 1 or 3. This is important because the 'A' symbol of a subsequent code word will never contain an illegal transition sequence from generated 'D' to generated 'A' when 'D' is odd. Illegal transition sequences from generated 'C' to generated 'D' are also prevented when 'D' is odd.

Referring to FIG. 5, there is shown a 3S4S conversion table. The 3S4S conversion table of FIG. 5 shows that some input combinations provide support for desirable clock recovery (CDR stands for clock data recovery in FIG. 5) symbol pairs. For example, those symbol pairs which contain 13, 31, 01, 10, 32, and 23 provide support for desirable clock recovery symbol pairs. Other input combinations are undesirable for clock recovery and require correction.

Figure 6:
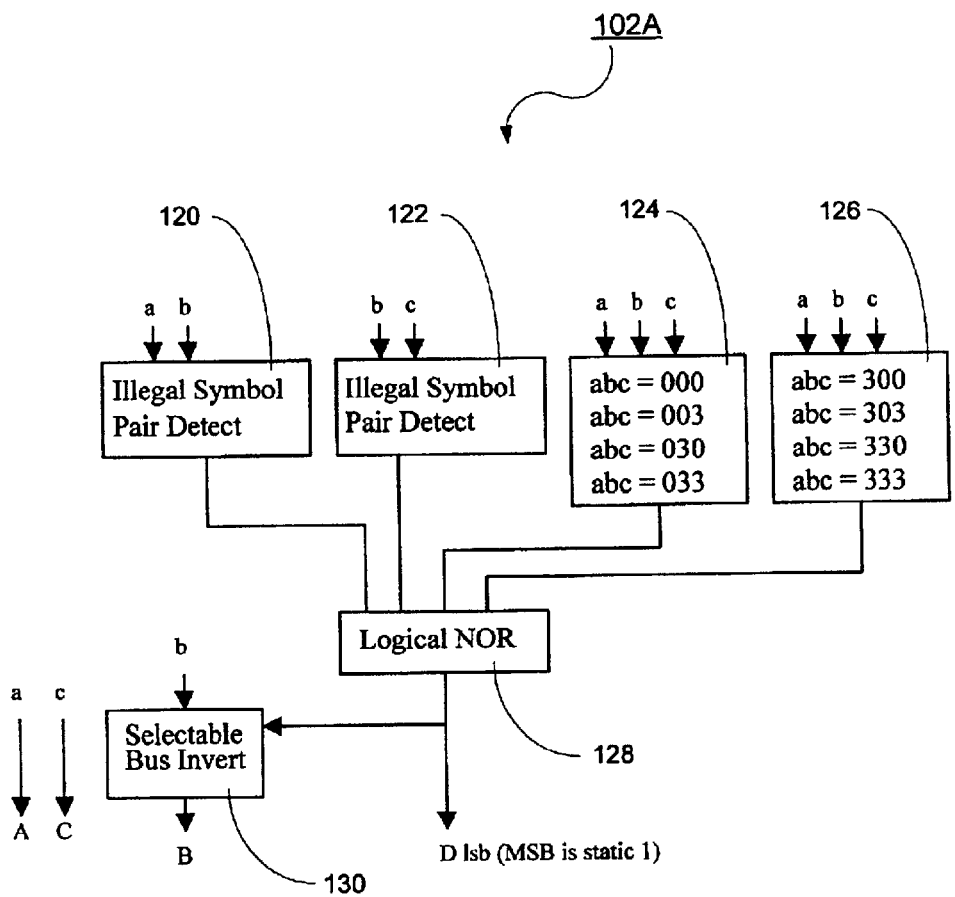
FIG. 6 shows a functional diagram of the 3S4S encoder shown in FIG. 4 in accordance with an embodiment of the present invention.

Referring to FIG. 6, there is shown a functional diagram of the 3S4S encoder 102A shown in FIG. 4. Detection functions 120 and 122 examine the values of the input symbols to detect whether the symbol pairs are either 2,0 or 0,2. Detection functions 124 and 126 cover the eight cases in the table of FIG. 5 which need special attention. In the embodiment illustrated, such special attention cases are encoded using an exception encoding scheme. Detection functions 124 and 126 and the associated exception encoding scheme may be implemented using a lookup table or similar circuitry. By using a lookup table for a small portion of the encoding function (e.g., exception cases) while employing a primary encoding scheme that can utilize relatively simple circuitry (e.g., symbol inversion), the circuitry required to perform the encoding function can be implemented in a limited amount of die area. As such, full-swing transitions can be avoided and CDR ensured without undue overhead.

The outputs of all of the detection functions 120–126 are provided to a logical NOR function 128. The output of the logical NOR function 128 is provided to a selectable bus inversion function 130, which generates the 'B' output by selectively inverting the 'b' bus when the 'D' MSB is equal to 0. Inverting the 'b' bus causes the values of the bits being transmitted on the bus to be inverted. For example, a symbol representing binary '11' would be altered to a symbol representing binary '00'. The output of the logical NOR function 128 is also used to construct the 'D' symbol, as shown. The 'a' and 'c' inputs are passed directly to the 'A' and 'C' outputs unchanged.

Figure 7:
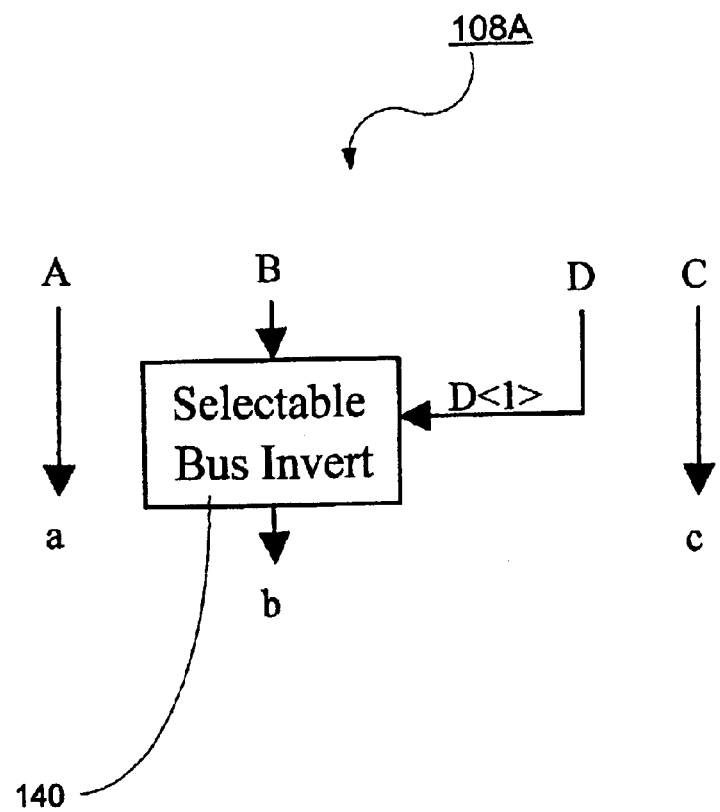
FIG. 7 shows a functional diagram of a 3S4S decoder for use with the 3S4S encoder shown in FIGS. 4 and 6 in accordance with an embodiment of the present invention.

Referring to FIG. 7, there is shown a functional diagram of a 3S4S decoder 108A for use with the 3S4S encoder 102A shown in FIGS. 4 and 6. As shown in FIG. 7, the 3S4S decoder 108A is quite simple. That is, a selectable bus inversion function 140 generates the 'b' output by selectively inverting the 'B' bus when the 'D' MSB is equal to 0. Otherwise, 'B' passes unchanged to the 'b' output when the 'D' MSB is equal to 1. Both 'A' and 'C' pass unchanged to the outputs 'a' and 'c'. The input 'D' is discarded.

The 3S4S transition-limiting code as defined above with reference to FIGS. 4–7 may be used as a basis for an 8S10S transition-limiting code. Such an 8S10S transition-limiting code may extend the benefits obtained with the 3S4S transition-limiting code, particularly those associated with the correction of 2,0 and 0,2 symbol pairs by symbol inversion and the retention of desirable clock recovery transitions. An 8S10S transition-limiting code also provides a common interface data width (16 bits/20 bits), which increases bandwidth efficiency to 80%. Further, an 8S10S transition-limiting code provides facilities for unique codes for framing and control characters, as discussed in detail below.

Assume an 8S10S transition-limiting code for encoding an input word 'abcdefgh' to an output word 'ABCDEFGHIJ', wherein the 'IJ' symbol pair represents an instruction. That is, the 8S10S transition-limiting code may be formed by first examining the existing properties of the input word 'abcdefgh', and then appending the 2-symbol opcode 'IJ' for transmission along with the modified word 'ABCDEFGH' to form the 10-symbol output word 'ABCDEFGHIJ'. The 2-symbol opcode 'IJ' represents an 'a', 'c', 'e', and 'g' symbol inversion (i.e., inversion code or invCode). The 'a' symbol inversion also depends upon the value of a previously converted 'J' symbol. The 2-symbol opcode 'IJ' is assigned values, excluding 0,2 and 2,0 symbol pairs, such that all output codes provide desirable clock recovery transition sequences. This may come through the opcode itself or through corrective actions specified by the opcode.

Thus, the 2-symbol opcode 'IJ' represents information that is necessary to perform a basic code translation method (i.e., an M0 translation method). However, since the 0,2 and 2,0 symbol pairs are excluded, there are only 14 combinations of the 2-symbol opcode 'IJ' that may be used, and so not all of the invCode values may be directly represented. Accordingly, since the 2-symbol opcode 'IJ' is not large enough to fully enumerate all of the invcode values necessary for the M0 translation method, additional methods are necessary to identify the remaining invCode values. These additional methods include a first additional code translation method (i.e., the M1 translation method) and a second additional code translation method (i.e., the M2 translation method). A complete 8S10S encoder chooses symbol codes from a combination of the M0 translation method, the M1 translation method, and the M2 translation method based upon multiplexer selections derived from a predefined 'IJ' Table.

Figure 8:
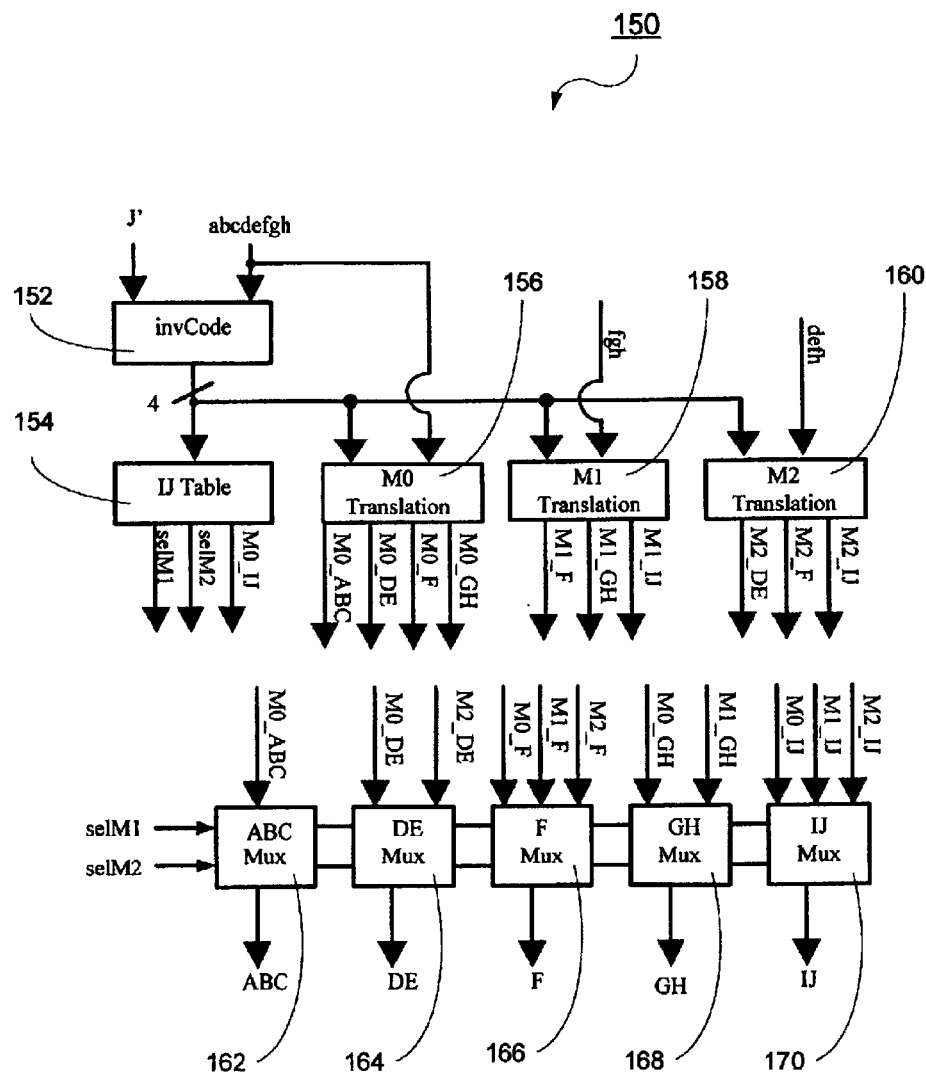
FIG. 8 shows an 8S10S encoder in accordance with an embodiment of the present invention.

Referring to FIG. 8, there is shown an 8S10S encoder 150 in accordance with an embodiment of the present invention. The 8S10S encoder 150 comprises an invCode detector 152, 'IJ' Table logic 154, M0 translation method logic 156, M1 translation method logic 158, M2 translation method logic 160, an 'ABC' symbol triplet multiplexer 162, a 'DE' symbol pair multiplexer 164, an 'F' symbol multiplexer 166, a 'GH' symbol pair multiplexer 168, and an 'IJ' symbol pair multiplexer 170.

The invCode detector 152 first examines the input word 'abcdefgh' along with the 'J' symbol of the previously encoded output word 'ABCDEFGHIJ' ("J'" represents the 'J' symbol of the previously encoded output word 'ABCDEFGHIJ'). If any illegal combination of symbols within symbol triplets J'ab, bcd, def, and fgh is encountered, a corresponding bit in the invCode is set to represent the position of the repair necessary. Illegal combinations detected include 20×, 02×, ×02, and ×20, while the repair mechanism involves symbol inversion by changing the middle symbol of a triplet from 0 to 3 or from 2 to 1. This change is made by the M0 translation method logic 156.

Figure 8A:
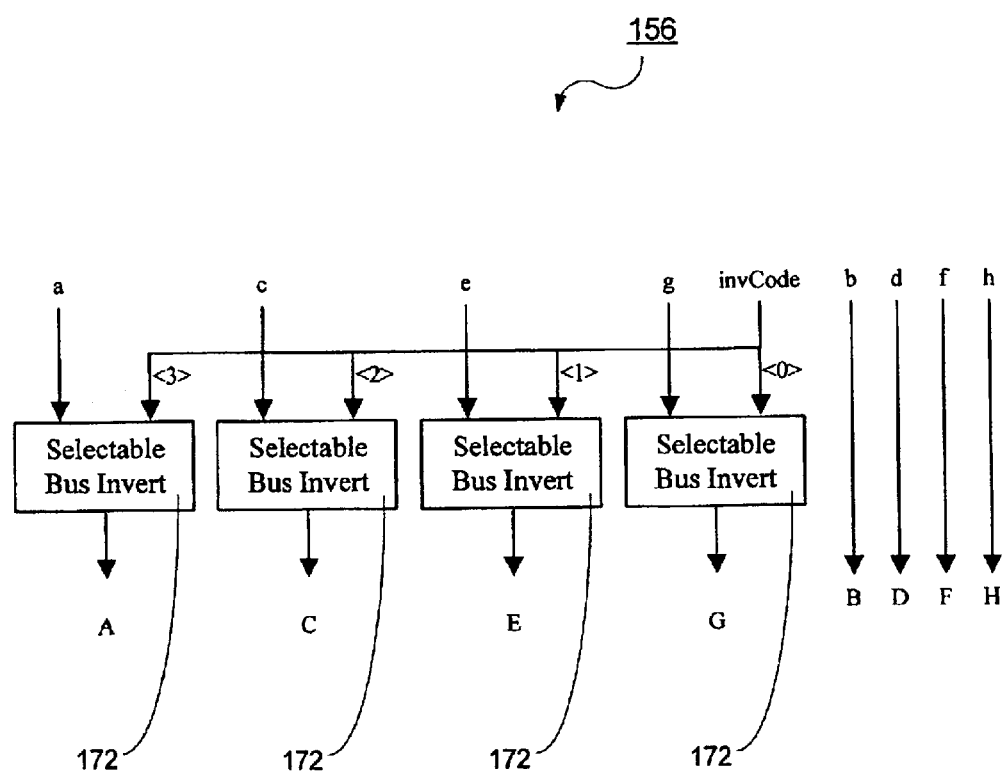
FIG. 8A shows a more detailed functional block diagram of the M0 translation method logic shown in the 8S10S encoder of FIG. 8.

Referring to FIG. 8A, there is shown a more detailed functional block diagram of the M0 translation method logic 156 shown in FIG. 8. As shown in FIG. 8A, the M0 translation method logic 156 comprises a plurality of selectable bus inversion functions 172. Each of the plurality of selectable bus inversion functions 172 operates by translating or mapping its respective input symbol to its inverse value when the respective input bit of the invcode is set to 1. For example, when the respective input bit of the invCode is set to 1, input symbol 00 translates or maps to output symbol 11, input symbol 01 translates or maps to output symbol 10, input symbol 10 translates or maps to output symbol 01, and input symbol 11 translates or maps to output symbol 00.

Difficulty arises when the sixteen invCode combinations need to be represented in an available space of fourteen symbol combinations because two of the symbol combinations are illegal (i.e., symbol combinations of 0,2 and 2,0 of the 2-symbol opcode 'IJ' are illegal). Also, the 'IJ' Table logic 154 must be carefully designed so that illegal symbol pairings are not introduced by concatenating the 2-symbol opcode 'IJ' to the repaired message word. Thus, the 'IJ' Table logic 154 directly encodes the most frequently occurring invCode combinations in order to cover a majority of input words.

Referring to FIG. 9A, all sixteen invCode combinations are shown, along with the number of input words requiring repair for each invCode. As shown in FIG. 9A, the nine most frequently occurring invcode combinations include 0000, 0001, 0010, 0100, 1000, 0011, 0110, 0101, and 1100.

Referring to FIG. 9B, there is shown an 'IJ' Table for the 'IJ' Table logic 154 of FIG. 8 in accordance with an embodiment of the present invention. The 'IJ' Table logic 154 operates in accordance with the 'IJ' Table shown in FIG. 9B to generate 'IJ' symbols for the nine most frequently occurring invcode combinations, thereby insuring that 61650 of the available 65536 input words are encoded through direct representation of these nine most frequently occurring invcode combinations. Since the symbol combinations of 0,2 and 2,0 are illegal, the remaining seven invcode combinations (i.e., 1001, 1010, 0111, 1110, 1101, 1011, and 1111) need to be represented using the M1 translation method logic 158 and the M2 translation method logic 160.

The M1 translation method logic 158 generates 'FGHIJ' symbols for possible inclusion into output word 'ABCDEFGHIJ'. The M2 translation method logic 160 generates 'DEFIJ' symbols for possible inclusion into output word 'ABCDEFGHIJ'. The 'IJ' Table logic 154 also uses the 'IJ' Table shown in FIG. 9B to generate multiplexer selection signals selM1 and selM2 for determining which symbols are included in output word 'ABCDEFGHIJ'.

Referring to FIGS. 10A and 10B, there is shown an M1 Table for the M1 translation method logic 158. That is, the inputs to the M1 translation method logic 158 are the input symbols 'fgh' and the calculated invcode. The M1 translation method logic 158 produces the M1 version of output symbols 'FGH' and the 2-symbol opcode 'IJ'. The M1 Table of FIGS. 10A and 10B shows the input-to-output mappings of the M1 translation method logic 158. These input-to-output mappings are selected to minimize the size of the M1 Table.

Referring to FIGS. 11A and 11B, there is shown an M2 Table for the M2 translation method logic 160. That is, the inputs to the M2 translation method logic 160 are the input symbols 'def', the calculated invCode, and the input symbol 'h'. The M2 translation method logic 160 produces the M2 version of output symbols 'DEF' and the 2-symbol opcode 'IJ'. The input symbol 'h' is used to select between two opcode values which identify that the M2 Table has been used. This ensures that an output 2-symbol opcode 'IJ' following an output symbol 'H' will not produce an illegal output symbol combination. The M2 Table of FIGS. 11A and 11B shows the input-to-output mappings of the M2 translation method logic 160. These input-to-output mappings are selected to minimize the size of the M2 Table.

Figure 12:
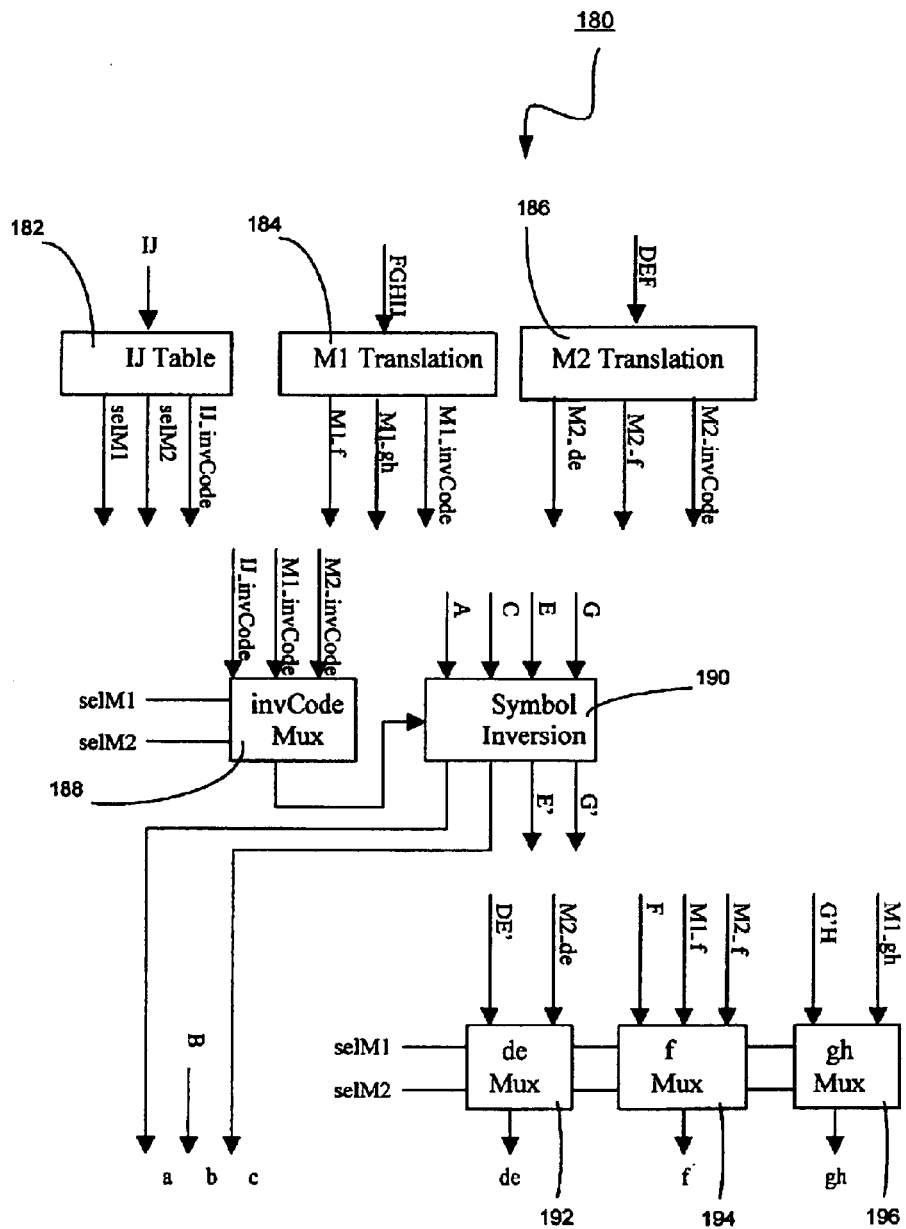
FIG. 12 shows an 8S10S decoder in accordance with an embodiment of the present invention.

Referring to FIG. 12, there is shown an 8S10S decoder 180 in accordance with an embodiment of the present invention. The 8S10S decoder 180 comprises 'IJ' Table logic 182, M1 translation method logic 184, M2 translation method logic 186, an invCode multiplexer 188, a symbol inversion function 190, a 'de' symbol pair multiplexer 192, an 'f' symbol multiplexer 194, and a 'gh' symbol pair multiplexer 196.

The 'IJ' Table logic 182 generates multiplexer selection signals selM1 and selM2 for controlling the invCode multiplexer 188, the 'de' symbol pair multiplexer 192, the 'f' symbol multiplexer 194, and the 'gh' symbol pair multiplexer 196. The 'IJ' Table logic 182 also generates an 'IJ' version of the invCode signal for input to the invCode multiplexer 188. The 'IJ' Table logic 182 operates in accordance with an 'IJ' Table.

Referring to FIG. 13, there is shown an 'IJ' Table for the 'IJ' Table logic 182 of FIG. 12 in accordance with an embodiment of the present invention. The 'IJ' Table of FIG. 13 shows the mapping from the coded input symbol pair 'IJ' to the three output signals (i.e., selm1, selm2, and the 'IJ' version of the invCode). When either selM1 or selM2 is asserted, the 'IJ' version of the invcode will not be used. In order to reduce logic complexity, a common value is used in order to provide common logic terms. This is done for the illegal input combinations as well. If one wanted to detect illegal input conditions in the coded input symbol pair 'IJ', then an additional output signal from the 'IJ' Table could be used which would report an error if the illegal entries were encountered.

The M1 translation method logic 184 generates an M1 version of the 'fgh' symbols for possible inclusion into output word 'abcdefgh'. The M1 translation method logic 184 also generates an M1 version of the invCode for input to the invCode multiplexer 188. When multiplexer selection signal selM1 is asserted, both the M1 version of the invCode and the M1 version of the 'fgh' symbols are used to generate the output word 'abcdefgh'. The M1 translation method logic 184 of FIG. 12 operates according to the same M1 Table (i.e., the M1 Table shown in FIGS. 10A and 10B) as the M1 translation method logic 158 of FIG. 8.

The M2 translation method logic 186 generates an M2 version of the 'def' symbols for possible inclusion into output word 'abcdefgh'. The M2 translation method logic 186 also generates an M2 version of the invcode for input to the invCode multiplexer 188. When multiplexer selection signal selM2 is asserted, both the M2 version of the invCode and the M2 version of the 'def' symbols are used to generate the output word 'abcdefgh'. The M2 translation method logic 186 of FIG. 12 operates according to the same M2 Table (i.e., the M2 Table shown in FIGS. 11A and 11B) as the M2 translation method logic 160 of FIG. 8.

The invCode multiplexer 188 determines which invCode is provided to the symbol inversion function 190 based upon the states of multiplexer selection signals selM2 and selM2. The symbol inversion function 190 generates inverted output symbols A', C', E', and G' that are either directly (i.e., A' and C') or possibly (i.e., E' and G') used to generate the output word 'abcdefgh'. Based upon the states of multiplexer selection signals selM2 and selM2, the 'de' symbol pair multiplexer 192, the 'f' symbol multiplexer 194, and the 'gh' symbol pair multiplexer 196 provide 'de', 'f', and 'gh' symbols, respectively, for the output word 'abcdefgh'.

Figure 12A:
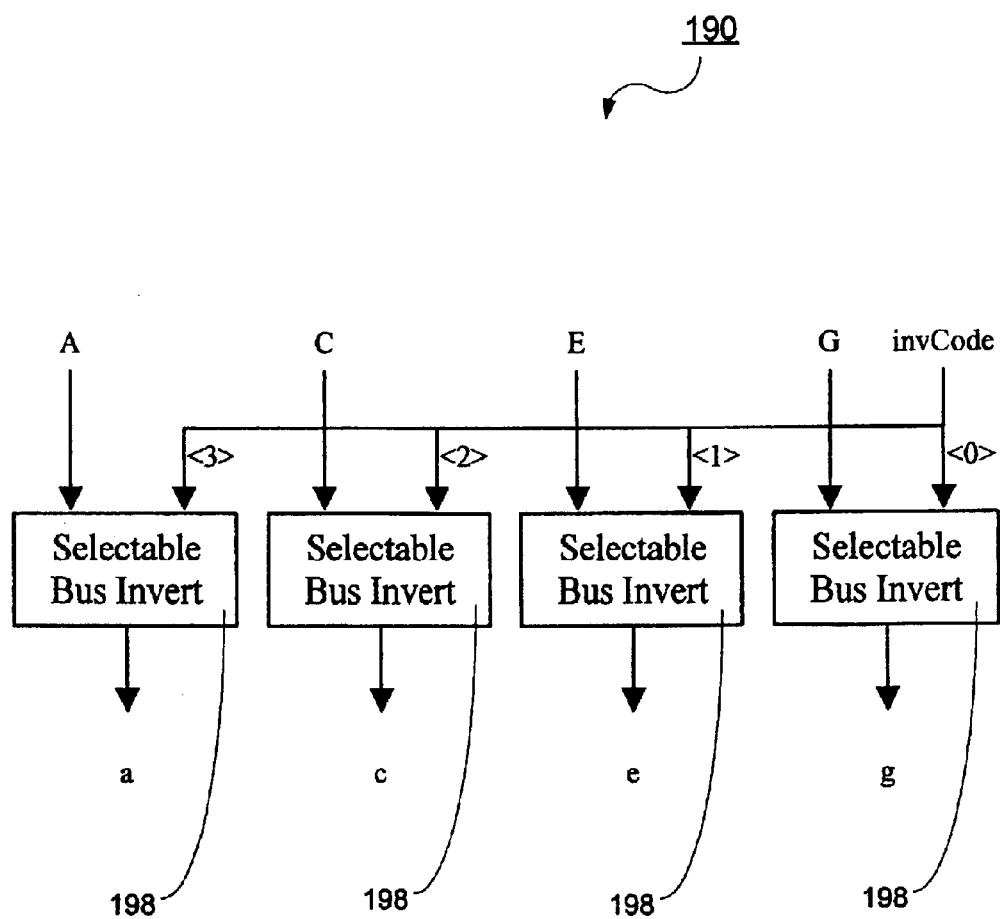
FIG. 12A shows a more detailed functional block diagram of the symbol inversion function shown in the 8S10S decoder of FIG. 12.

Referring to FIG. 12A, there is shown a more detailed functional block diagram of the symbol inversion function 190 shown in FIG. 12. As shown in FIG. 12A, the symbol inversion function 190 comprises a plurality of selectable bus inversion functions 198. Each of the plurality of selectable bus inversion functions 198 operates by translating or mapping its respective input symbol to its inverse value when the respective input bit of the invCode is set to 1. For example, when the respective input bit of the invCode is set to 1, input symbol 00 translates or maps to output symbol 11, input symbol 01 translates or maps to output symbol 10, input symbol 10 translates or maps to output symbol 01, and input symbol 11 translates or maps to output symbol 00.

Figure 14:
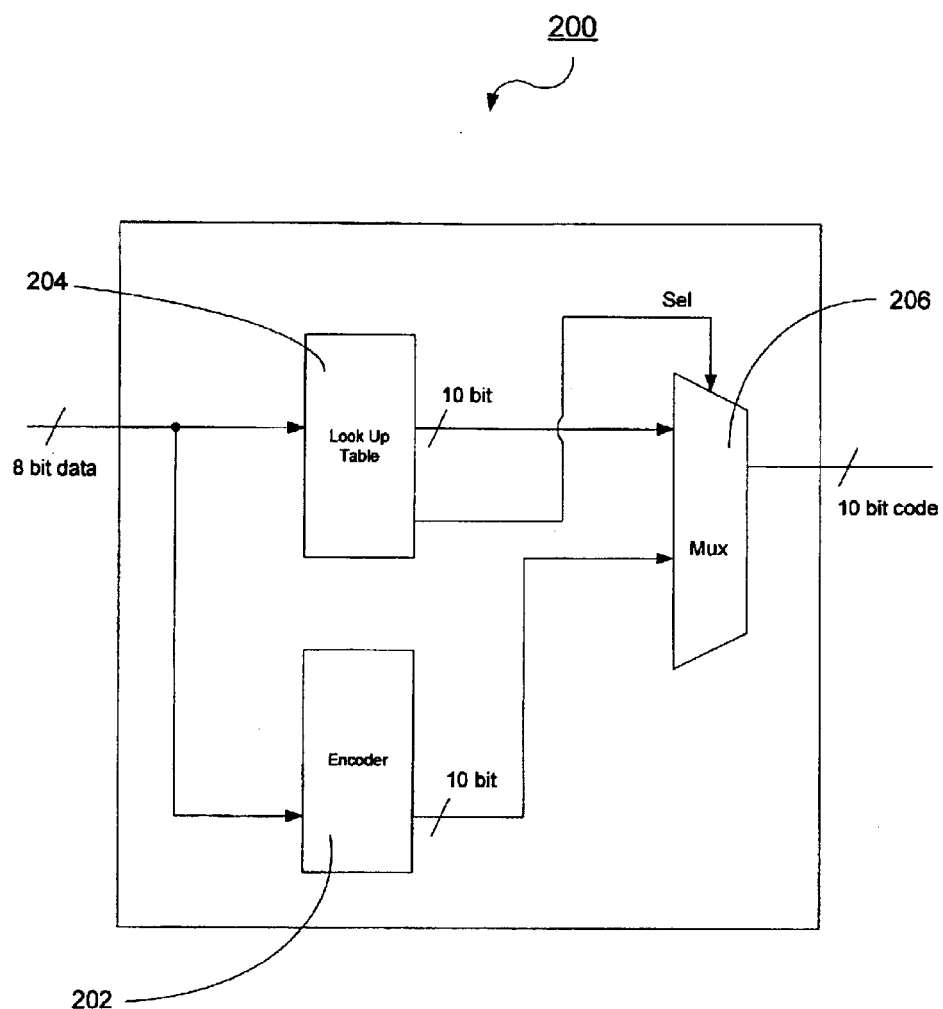
FIG. 14 shows a 4S5S encoder for providing a 4S5S transition-limiting code in accordance with an embodiment of the present invention.

In an alternative embodiment, the present invention may be realized as a 4S5S transition-limiting code. Referring to FIG. 14, there is shown a 4S5S encoder 200 for providing such a 4S5S transition-limiting code. The 4S5S encoder 200 comprises an 8-bit to 10-bit encoder 202, look-up table logic 204, and a multiplexer 206. The 4S5S encoder 200 receives 8-bit data words and provides 10-bit code words. Both the 8-bit to 10-bit encoder 202 and the look-up table logic 204 receive 8-bit data words and provide 10-bit code words. The look-up table logic 204 also provides a multiplexer selection signal to the multiplexer 206. The multiplexer 206 determines which 10-bit code word is provided as the output 10-bit code word from the 4S5S encoder 200 based upon the state of the multiplexer selection signal.

The 4S5S encoder 200 may support several different types of 4S5S encoding in accordance with the present invention. A first type, herein referred to as 4S5S edge stuffing (ES) encoding, utilizes an n-to-n+1-to-n+2 bit domain design technique. In this technique, all 8-bit data words are first converted into 9-bit blocks having even parity by appending one parity bit to the 8-bit data word. It should be noted that the 9-bit blocks may instead have odd parity in accordance with an alternative embodiment of the present invention.

There are 350 total available 10-bit code words which qualify for full-swing elimination (FSE). By appending an even parity bit there are 100 code words which pre-qualify for FSE. Among these 100 code words, 92 code words secure at least one small MSB or LSB transition per a five symbol block. The remaining non-qualified code words either allow full-swing transitions (FST), or there is no useful symbol transition per a five symbol block. In these cases, the violating 9-bit code words are mapped to 10-bit code words by converting the code words to odd parity by flipping an odd number of bits and simultaneously performing FSE. This mapping covers 226 cases.

Direct mapping is applied to the remaining group of 30 data words for which the encoding function does not produce full-swing elimination (FSE) or good clock data recovery (CDR) transitions. There are a total of 114 spare FSE-compliant code words. Out of these 114 code words, 30 code words may be selected for encoding the 30 data words by direct mapping using the look-up table logic 204. Out of these 114 spare FSE-compliant code words, there are 98 code words which have at least one small MSB and/or LSB transition. Out of these 98 code words, 30 code words may alternatively be selected for encoding the 30 data words by direct mapping using the look-up table logic 204. Out of these 98 code words, there are 56 code words which have at least one small MSB transition. Out of these 56 code words, 30 code words may also alternatively be selected for encoding the 30 data words by direct mapping using the look-up table logic 204. Out of these 56 code words, there are 36 code words with DC balance in the [7 9] range where the total sum's range is [0 15]. Out of these 36 code words, 30 code words may still alternatively be selected for encoding the 30 data words by direct mapping using the look-up table logic 204.

Figure 15:
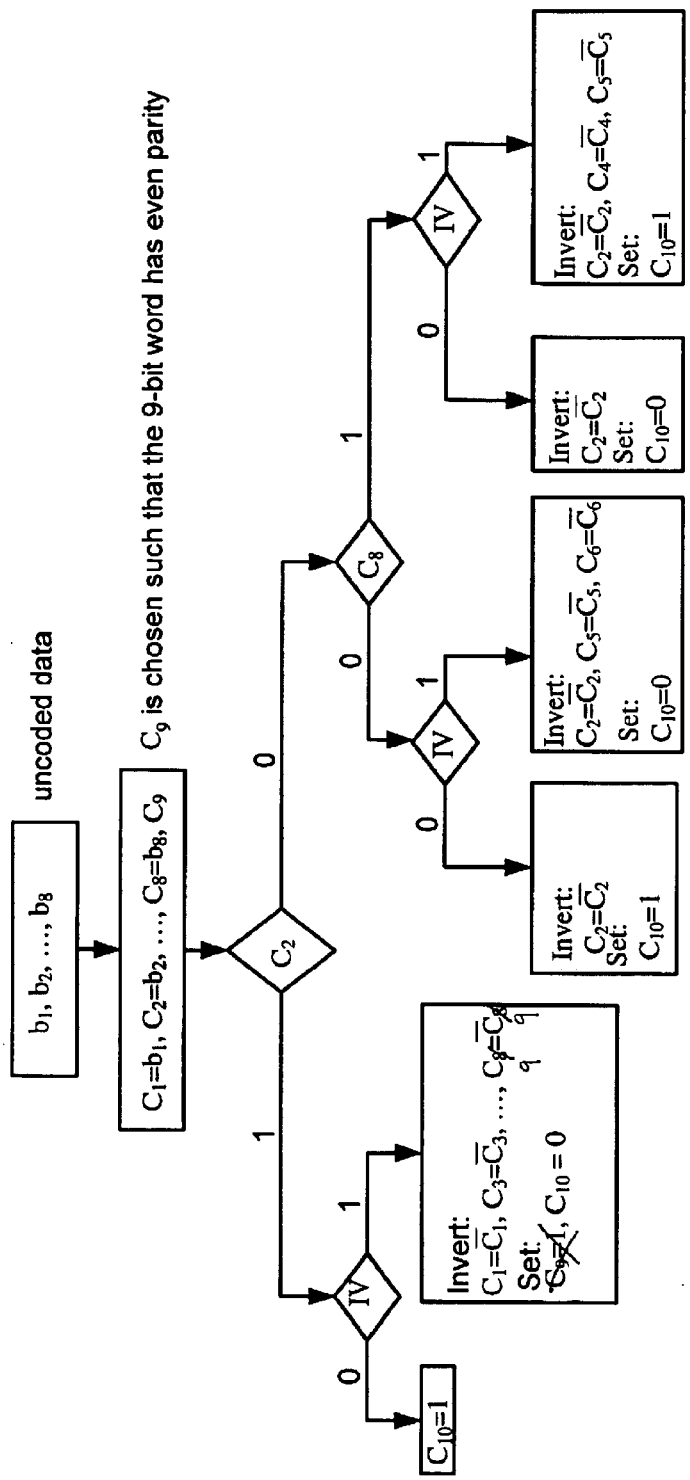
FIG. 15 shows a logical flow chart for the 4S5S encoder of FIG. 14 for supporting 4S5S edge stuffing (ES) encoding in accordance with an embodiment of the present invention.

Referring to FIG. 15, there is shown a logical flow chart for the 8-bit to 10-bit encoder 202 in the 4S5S encoder 200 of FIG. 14 for supporting 4S5S edge stuffing (ES) encoding in accordance with an embodiment of the present invention.

Referring to FIG. 16, there is shown a look-up table for the look-up table logic 204 in the 4S5S encoder 200 of FIG. 14 for supporting 4S5S edge stuffing (ES) encoding in accordance with an embodiment of the present invention. The look-up table of FIG. 16 may be formed by choosing any 30 of the 98 FSE-compliant code words which have small MSB and/or LSB transitions. It should be noted that the pairings shown in the look-up table of FIG. 16 may be rearranged to optimize and minimize the look-up table logic 204.

A second type of 4S5S encoding, herein referred to as 4S5S center stuffing (CS) encoding, differs from 4S5S edge stuffing (ES) encoding in the location of the stuffing bits. That is, unlike 4S5S edge stuffing (ES) encoding, wherein bits are stuffed at the end of a code word, in 4S5S center stuffing (CS) encoding, bits are stuffed in the center of a code word.

Figure 17:
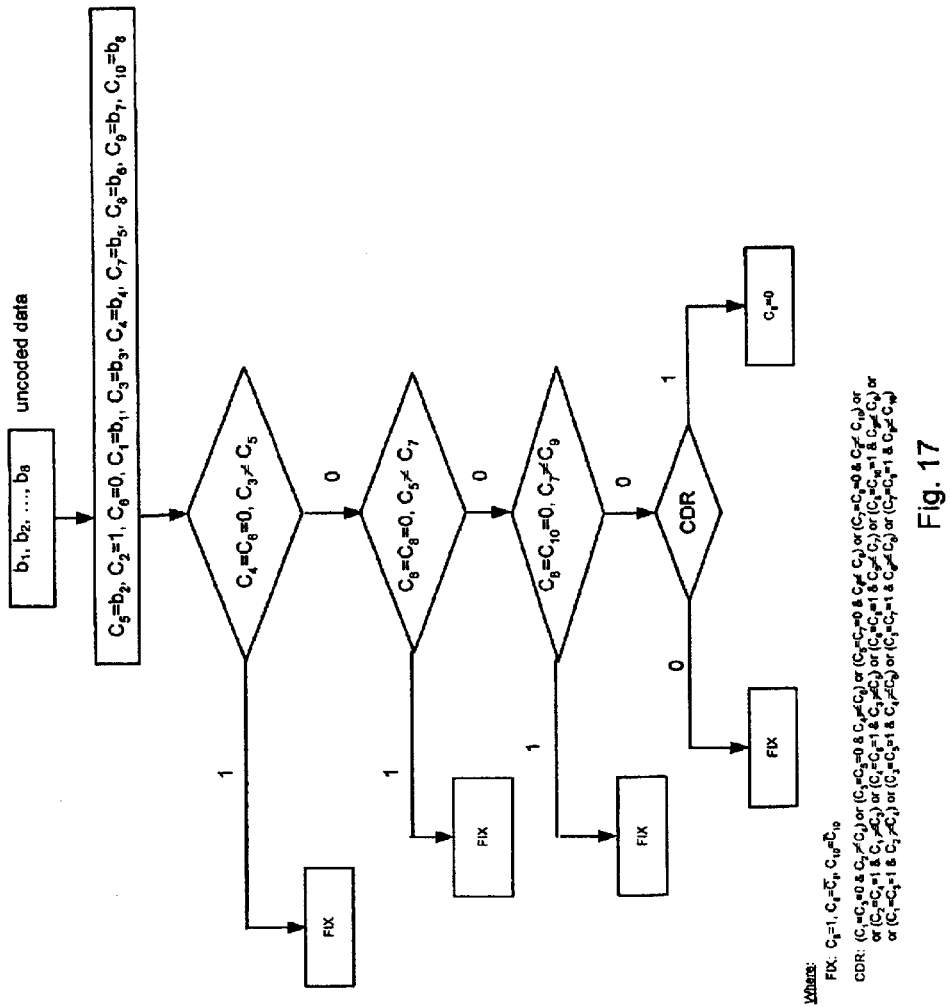
FIG. 17 shows a logical flow chart for the 4S5S encoder of FIG. 14 for supporting 4S5S center stuffing (CS) encoding in accordance with an embodiment of the present invention.

Referring to FIG. 17, there is shown a logical flow chart for the 8-bit to 10-bit encoder 202 in the 4S5S encoder 200 of FIG. 14 for supporting 4S5S center stuffing (CS) encoding in accordance with an embodiment of the present invention. As shown in FIG. 17, in 4S5S center stuffing (CS) encoding, each bit in the 8-bit uncoded data word ($b_1$, $b_2$, $b_3$, $b_4$, $b_5$, $b_6$, $b_7$, $b_8$) is assigned to a corresponding bit in the 10-bit code word ($C_1$, $C_2$, $C_3$, $C_4$, $C_5$, $C_6$, $C_7$, $C_8$, $C_9$, $C_{10}$). The two bits that are used for stuffing are $C_5$ and $C_6$. Bit $C_2$ is always set to 1 so that there are no FSE violations from the previous code word. Bit $C_5$ assumes the value of bit $b_2$. Bit $C_6$ is set to 0, and the 10-bit code word is progressively checked for FSE and CDR violations. In case of any FSE or CDR violations, bit $C_6$ is set to 1, and bits $C_8$ and $C_{10}$ are inverted. This process results in 16 cases of FSE and CDR violations, which are encoded by direct mapping using the look-up table logic 204.

Referring to FIG. 18, there is shown a look-up table for the look-up table logic 204 in the 4S5S encoder 200 of FIG. 14 for supporting 4S5S center stuffing (CS) encoding in accordance with an embodiment of the present invention. It should be noted that the pairings shown in the look-up table of FIG. 18 may be rearranged to optimize and minimize the look-up table logic 204.

Figure 19:
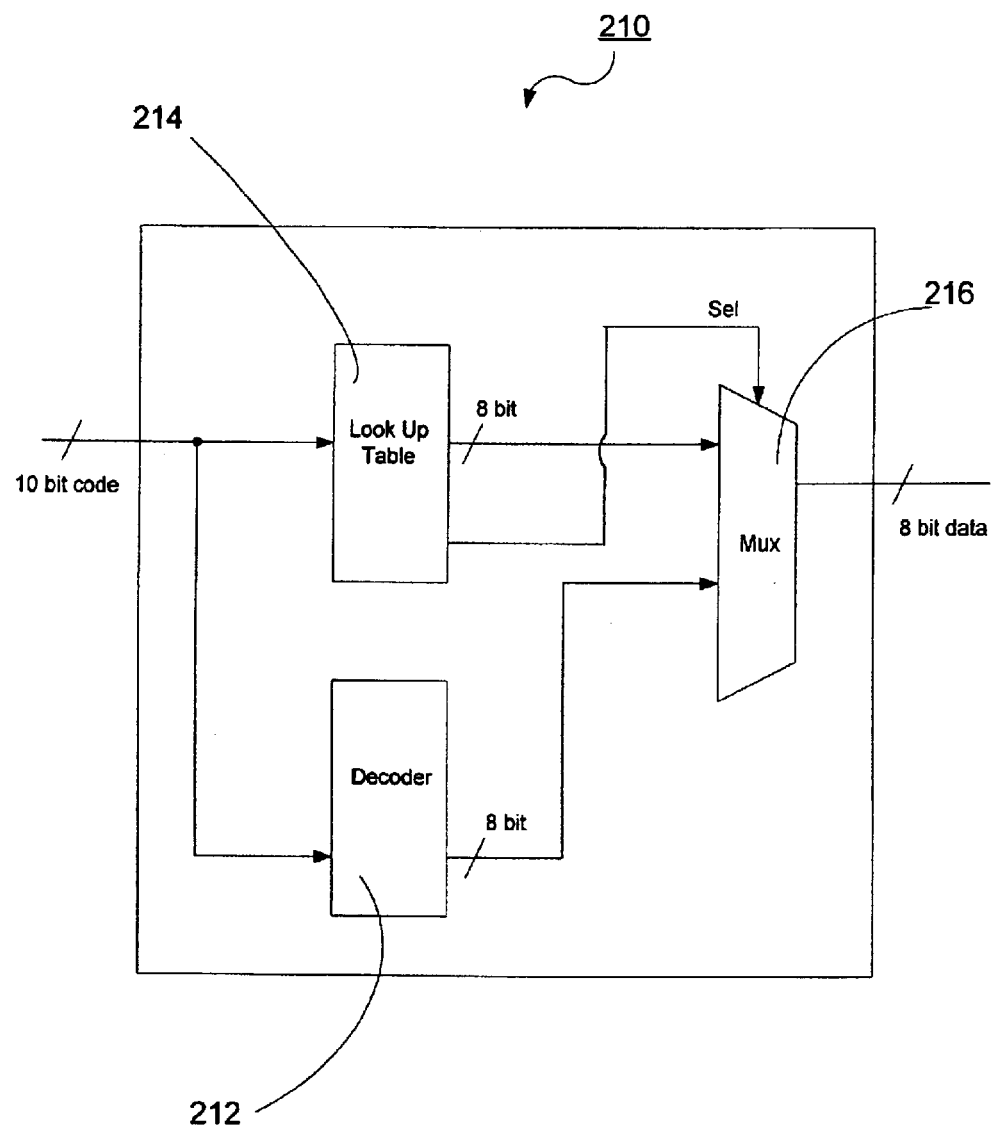
FIG. 19 shows a 4S5S decoder for use with the 4S5S encoder of FIG. 14.

Referring to FIG. 19, there is shown a 4S5S decoder 210 for use with the 4S5S encoder 200 of FIG. 14. The 4S5S decoder 210 comprises an 10-bit to 8-bit decoder 212, look-up table logic 214, and a multiplexer 216. The 4S5S decoder 210 receives 10-bit code words and provides 8-bit data words. Both the 10-bit to 8-bit decoder 212 and the look-up table logic 214 receive 10-bit code words and provide 8-bit data words. The look-up table logic 214 also provides a multiplexer selection signal to the multiplexer 216. The multiplexer 216 determines which 8-bit data word is provided as the output 8-bit data word from the 4S5S decoder 210 based upon the state of the multiplexer selection signal.

Figure 20:
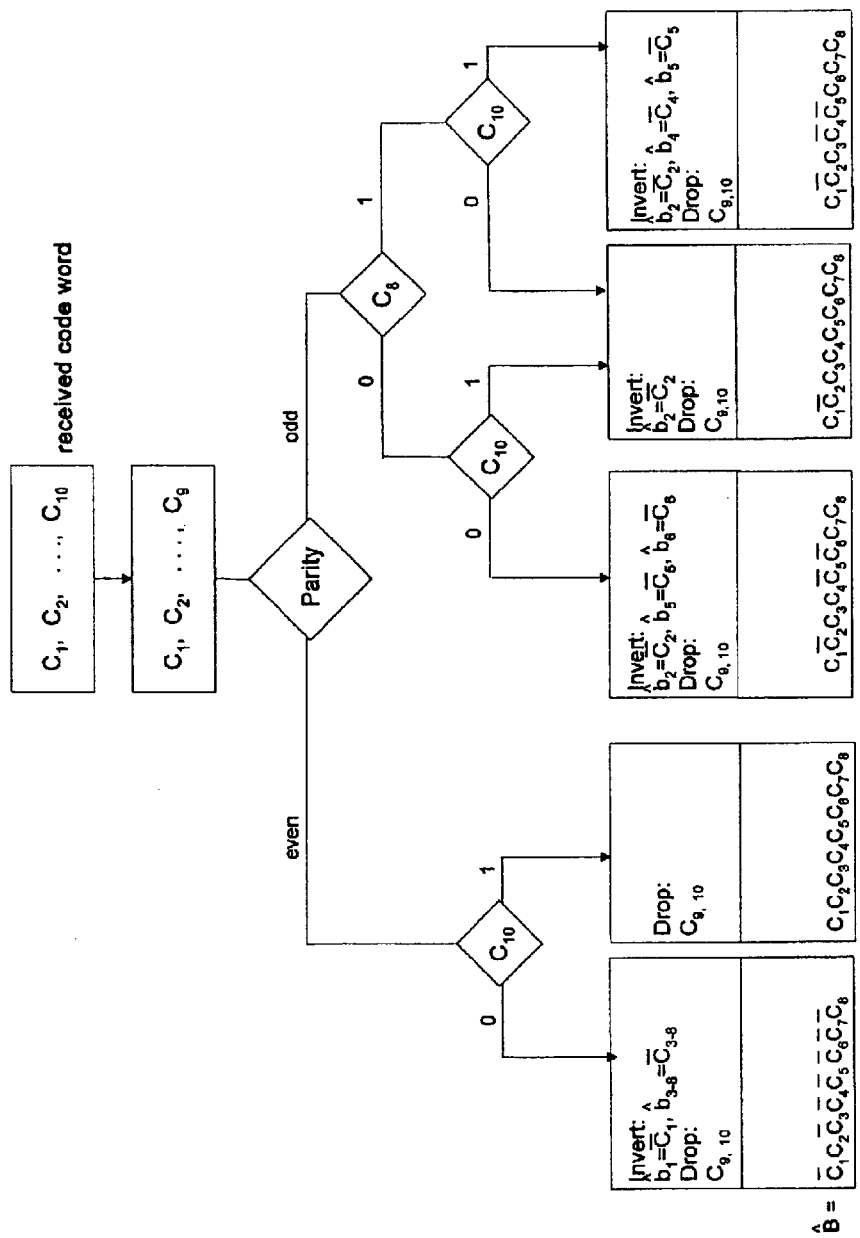
FIG. 20 shows a logical flow chart for the 4S5S decoder of FIG. 19 for supporting 4S5S edge stuffing (ES) decoding in accordance with an embodiment of the present invention.

Referring to FIG. 20, there is shown a logical flow chart for the 10-bit to 8-bit decoder 212 in the 4S5S decoder 210 of FIG. 19 for supporting 4S5S edge stuffing (ES) decoding in accordance with an embodiment of the present invention. The look-up table logic 214 may use the same look-up table for 4S5S edge stuffing (ES) decoding as is used for 4S5S edge stuffing (ES) encoding (e.g., the look-up table shown in FIG. 16), but with reverse mapping.

The 4S5S edge stuffing (ES) decoding operation is simply the reverse of the 4S5S edge stuffing (ES) encoding operation. That is, after checking the look-up table logic 214 for the 30 code words that are encoded by direct mapping using the look-up table logic 204, based on the combination of the 9-bit block parity and code word bits $C_8$ and $C_{10}$, the bit-flipping operations are reversed, and code word bits $C_9$ and $C_{10}$ are dropped to form the initial 8-bit data word.

Figure 21:
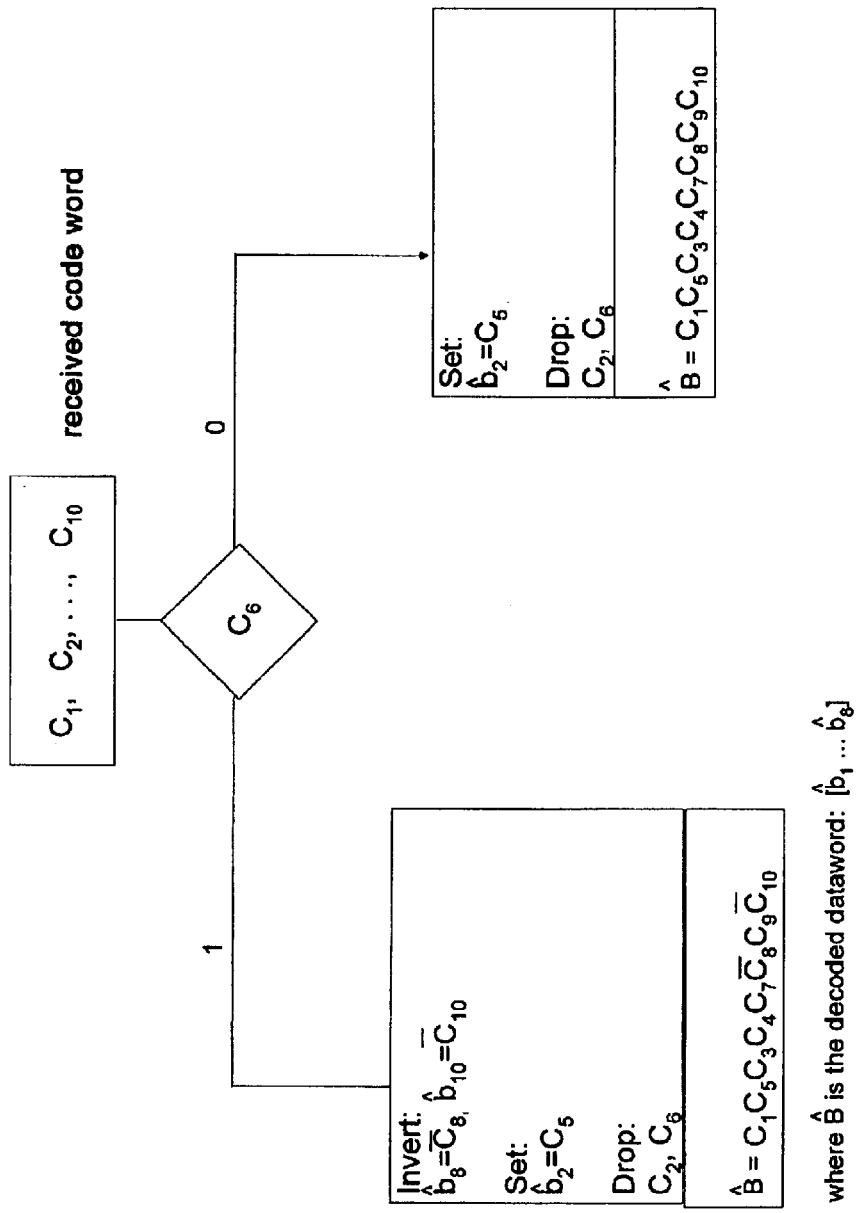
FIG. 21 shows a logical flow chart for the 4S5S decoder of FIG. 19 for supporting 4S5S center stuffing (CS) decoding in accordance with an embodiment of the present invention.

Referring to FIG. 21, there is shown a logical flow chart for the 10-bit to 8-bit decoder 212 in the 4S5S decoder 210 of FIG. 19 for supporting 4S5S center stuffing (CS) decoding in accordance with an embodiment of the present invention. The look-up table logic 214 may use the same look-up table for 4S5S center stuffing (CS) decoding as is used for 4S5S center stuffing (CS) encoding (e.g., the look-up table shown in FIG. 18), but with reverse mapping.

The 4S5S center stuffing (CS) decoding operation is described as follows. The look-up table logic 214 is used to first check for the 16 code words that are encoded by direct mapping using the look-up table logic 204. Next, data word bit $b_2$ is assigned to code word bit $C_5$, and if $C_6$ is equal to 1, code word bits $C_8$ and $C_{10}$ are inverted. Then, code word bits $C_5$ and $C_6$ are dropped to form the initial 8-bit data word.

All of the above-described encoding techniques support complete FSE between all output symbol pairs both within and between concatenated code words. For the 8S10S transition-limiting code, all code words except one have at least one CDR transition per a ten symbol block. The two 4S5S transition-limiting codes guarantee at least one transition per a five symbol block. The 8S10S transition-limiting code performs state-dependent encoding requiring a 'look-behind' type of operation for the encoder and creating critical path requirements, while the two 4S5S transition-limiting codes are state-independent. In addition, all of the above-described encoding techniques allow the definition of unique control characters without bypassing their primary encoding functions. For example, in the parity-based 4S5S edge stuffing (ES) transition-limiting code, the 10-bit code word 0100000000 is an FSE and CDR compliant code word, unique with respect to all possible concatenations of the assigned code words, so that it can be used for synchronization/framing purposes. Other such 10-bit code words for use for synchronization/framing purposes include 0000000001, 0000000100, 0000000110, 0000001110, 1010100100, 1010101011, 1010101100, 1010101110, and 1110101010.

At this point it should be noted that the two 4S5S transition-limiting codes have a unique property wherein the two outer 4-PAM signal levels are periodically unused. That is, assuming T is the symbol period, every 5T the two outer 4-PAM signal levels (highest and lowest) are not used (i.e., there are no transitions starting from or ending with these two outer 4-PAM signal levels). The periodic non-use of these two outer 4-PAM signal levels allows for their alternative use in framing codewords (i.e., identifying the boundary of a codeword).

At this point it should be noted that improving the quality of transmitted digital signals in accordance with the present invention as described above may involve the processing of input data and the generation of output data to some extent. This input data processing and output data generation may be implemented in hardware or software. For example, as described above, specific electronic components may be employed in an encoder, decoder, or other similar or related circuitry for implementing the functions associated with improving the quality of transmitted digital signals in accordance with the present invention as described above. Alternatively, one or more processors operating in accordance with stored instructions may implement the functions associated improving the quality of transmitted digital signals in accordance with the present invention as described above. If such is the case, it is within the scope of the present invention that such instructions may be stored on one or more processor readable carriers (e.g., a magnetic disk), or transmitted to one or more processors via one or more signals.

In summary, to increase robustness of multi-level signaling to reflections and cross-talk, the present invention provides a family of transition-limiting codes that eliminate undesirable transitions, which can include, for example, full-swing transitions and transitions that are not helpful in CDR. Such elimination can be accomplished by modification of one or both of two symbols between which the undesirable transition occurs. Such modification may utilize symbol inversion, inversion of an odd number of bits in a symbol set, lookup tables, or other techniques where some modifications may require special attention. In special attention cases, an exception encoding scheme is utilized to modify symbols that cannot be adequately modified based on a primary modification technique (e.g., symbol inversion).

The transition-limiting codes have very low hardware complexity, which is essential in high-speed serial-link systems. In addition to increasing voltage margins via the elimination of worst case sequences and the reduction of peak distortion, these transition-limiting codes increase timing margins by full-swing elimination, which is another critical aspect of multi-level signaling. Furthermore, these transition-limiting codes guarantee a sufficient number of transitions for clock recovery.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for improving the quality of transmitted digital signals in a multi-level signaling system, the method comprising the steps of:

encoding digital values represented by sets of N bits to provide corresponding sets of P symbols; and transmitting the sets of P symbols;

wherein each symbol in the sets of P symbols is transmitted at one of at least three signal levels, wherein the digital values are encoded to eliminate full-swing transitions between successive symbol transmissions, and wherein the digital values are further encoded to include at least one clock recovery transition between transmissions of two successive symbols in each set of P symbols.

2. The method as defined in claim 1, wherein each set of P symbols is formed with Q bits, wherein Q is greater than N.

3. The method as defined in claim 2, wherein N=8 and Q=10.

4. The method as defined in claim 2, wherein N=6 and Q=8.

5. The method as defined in claim 2, wherein N=16 and Q=20.

6. The method as defined in claim 1, wherein each symbol in the sets of P symbols is transmitted at one of four signal levels on a single transmission medium.

7. The method as defined in claim 6, wherein the single transmission medium comprises a single electrical conductor.

8. The method as defined in claim 6, wherein the single transmission medium comprises a differential pair of electrical conductors.

9. The method as defined in claim 6, wherein the single transmission medium comprises an optical fiber.

10. The method as defined in claim 6, wherein each symbol represents two bits.

11. The method as defined in claim 1, wherein each clock recovery transition is substantially geometrically centered between transmissions of two successive symbols.

12. The method as defined in claim 1, wherein each clock recovery transition occurs between adjacent signal levels and only one of a most significant symbol bit and a least significant symbol bit changes during each clock recovery transition.

13. The method as defined in claim 1, further comprising the steps of:
    receiving the transmitted sets of P symbols; and
    decoding the digital values represented by sets of N bits from the transmitted sets of P symbols.

14. The method as defined in claim 1, wherein a first symbol of each set of P symbols is selected to ensure that undesirable transitions do not occur between neighboring sets of P symbols.

15. The method as defined in claim 1, wherein a last symbol of each set of P symbols is selected to ensure that undesirable transitions do not occur between neighboring sets of P symbols.

16. The method as defined in claim 1, wherein the corresponding sets of P symbols include a first symbol and a second symbol, and wherein encoding further comprises:
    detecting an undesirable transition between the first and second symbols; and
    modifying at least one of the first and second symbols to eliminate the undesirable transition.

17. The method as defined in claim 16, wherein the undesirable transition corresponds to a full-swing transition between the first and second symbol, wherein the first and second symbols are adjacent symbols within the corresponding sets of P symbols.

18. The method as defined in claim 16, wherein modifying at least one of the first and second symbols comprises inverting an odd number of symbol bits in a first set of P symbols that includes the first and second symbols.

19. The method as defined in claim 16, wherein modifying further comprises:
    when selectively inverting at least one of the first and second symbols does not eliminate the undesirable transition:
        encoding at least one of the first and second symbols using a predetermined exception encoding scheme; and
        including in the corresponding sets of P symbols an indication that the at least one of the first and second symbols has been encoded using the exception encoding scheme.

20. The method as defined in claim 16, wherein modifying further comprises:
    when selectively inverting at least one of the first and second symbols eliminates the undesirable transition:
        inverting at least one of the first and second symbols; and
        including in the corresponding sets of P symbols an indication that the at least one of the first and second symbols has been inverted.

21. The method as defined in claim 20, wherein a determination as to whether selectively inverting at least one of the first and second symbols eliminates the undesirable transition is performed using a lookup table.

22. The method as defined in claim 20, wherein inverting a symbol further comprises performing a bit-wise inversion of all bits within the symbol.

23. The method as defined in claim 1, wherein the corresponding sets of P symbols include a first set of P symbols, and wherein encoding further comprises:
    detecting a lack of a clock recovery transition within the first set of P symbols; and
    modifying at least one symbol within the first set of P symbols to induce a clock recovery transition within the first set of P symbols.

24. The method as defined in claim 23, wherein modifying further comprises performing a bit-wise inversion of the at least one symbol of the first set of P symbols.

25. The method as defined in claim 23, wherein modifying further comprises performing a bit-wise inversion of only one symbol of the first set of P symbols.

26. The method as defined in claim 1, wherein encoding further comprises encoding the digital values such that a selected symbol in each set of P symbols is limited to a subset of possible symbol choices.

27. The method as defined in claim 26, wherein the selected symbol is one of a first symbol and a last symbol of the set of P symbols.

28. The method as defined in claim 27, wherein the subset of possible symbol choices does not include either a highest signal level or a lowest signal level of the more than two signal levels.

29. The method as defined in claim 28, further comprising:
    receiving the transmitted sets of P symbols;
    decoding the digital values represented by the sets of N bits from the transmitted sets of P symbols; and
    detecting at least a portion of the selected symbols in the sets of P symbols.

30. The method as defined in claim 29, wherein detecting at least a portion of the selected symbols further comprises using the selected symbols to produce framing information corresponding to the sets of P symbols.

31. At least one signal embodied in at least one carrier wave for transmitting a computer program of instructions configured to be readable by at least one processor for instructing the at least one processor to execute a computer process for performing the method as recited in claim 1.

32. At least one processor readable carrier for storing a computer program of instructions configured to be readable by at least one processor for instructing the at least one processor to execute a computer process for performing the method as recited in claim 1.

33. An apparatus for improving the quality of transmitted digital signals in a multi-level signaling system, the apparatus comprising:
    an encoder for encoding digital values represented by sets of N bits to provide corresponding sets of P symbols; and a transmitter for transmitting the sets of P symbols;

wherein the transmitter transmits each symbol in the sets of symbols at one of at least three signal levels, wherein the encoder encodes the digital values to eliminate full-swing transitions between successive symbol transmissions, and wherein the encoder further encodes the digital values to include at least one clock recovery transition between transmissions of two successive symbols in each set of P symbols.

34. The apparatus as defined in claim 33, wherein each set of P symbols is formed with Q bits, wherein Q is greater than N.

35. The apparatus as defined in claim 34, wherein N=8 and Q=10.

36. The apparatus as defined in claim 34, wherein N=6 and Q=8.

37. The apparatus as defined in claim 34, wherein N=16 and Q=20.

38. The apparatus as defined in claim 33, wherein each symbol in the sets of P symbols is transmitted at one of four signal levels on a single transmission medium.

39. The apparatus as defined in claim 38, wherein the transmitter is a serializing single-ended transmitter.

40. The apparatus as defined in claim 39, wherein the single transmission medium comprises a single electrical conductor.

41. The apparatus as defined in claim 38, wherein the transmitter is a serializing differential transmitter.

42. The apparatus as defined in claim 41, wherein the single transmission medium comprises a differential pair of electrical conductors.

43. The apparatus as defined in claim 38, wherein the transmitter is a serializing optical transmitter.

44. The apparatus as defined in claim 38, wherein each symbol represents two bits.

45. The apparatus as defined in claim 33, wherein each clock recovery transition is substantially geometrically centered between transmissions of two successive symbols.

46. The apparatus as defined in claim 33, wherein each clock recovery transition occurs between adjacent signal levels and only one of a most significant symbol bit and a least significant symbol bit changes during each clock recovery transition.

47. The apparatus as defined in claim 33, further comprising:

a receiver for receiving the transmitted sets of P symbols; and a decoder for decoding the digital values of N bits from the transmitted sets of P symbols.

48. The apparatus as defined in claim 47, wherein the receiver is a serializing single-ended receiver.

49. The apparatus as defined in claim 47, wherein the receiver is a serializing differential receiver.

50. The apparatus as defined in claim 47, wherein the receiver is a serializing optical receiver.

51. The apparatus as defined in claim 33, wherein the encoder includes inversion circuitry to selectively invert symbol bits in order to eliminate full-swing transitions.

52. The apparatus as defined in claim 51, wherein the encoder further includes exception encoding circuitry to encode symbols using an exception encoding scheme when selective inversion of symbol bits does not eliminate a full-swing transition.

53. The apparatus as defined in claim 33, wherein the encoder includes a lookup table.

* * * * *